US007548297B2

(12) United States Patent
Shigemura et al.

(10) Patent No.: US 7,548,297 B2
(45) Date of Patent: Jun. 16, 2009

(54) LIQUID CRYSTAL DISPLAY DEVICE AND METHOD FOR MANUFACTURING THE SAME

(75) Inventors: Koji Shigemura, Tokyo (JP); Tsutomu Hiroya, Tokyo (JP)

(73) Assignee: NEC Corporation, Tokyo (JP)

( * ) Notice: Subject to any disclaimer, the term of this patent is extended or adjusted under 35 U.S.C. 154(b) by 624 days.

(21) Appl. No.: 11/402,941

(22) Filed: Apr. 13, 2006

(65) Prior Publication Data

US 2006/0232740 A1    Oct. 19, 2006

(30) Foreign Application Priority Data

Apr. 18, 2005    (JP)    ............... 2005-120091

(51) Int. Cl.
*G02F 1/1339*    (2006.01)
(52) U.S. Cl. ...................... 349/153; 349/123
(58) Field of Classification Search ......... 349/122–123, 349/153, 155
See application file for complete search history.

(56) References Cited

U.S. PATENT DOCUMENTS 6,724,448 B2 *    4/2004   Nakahara ................. 349/123

FOREIGN PATENT DOCUMENTS

| JP | 10-268310 A | 10/1998 |
| JP | 11-2820 A | 1/1999 |
| JP | 2000-47228 A | 2/2000 |
| JP | 2000-47241 A | 2/2000 |
| JP | 2001-183690 A | 7/2001 |
| JP | 2003-295191 A | 10/2003 |

* cited by examiner

*Primary Examiner*—Frank G Font
*Assistant Examiner*—Michael P Mooney
(74) *Attorney, Agent, or Firm*—Sughrue Mion, PLLC

(57) ABSTRACT

A cut-out part is formed in the end part of the alignment film of a TFT substrate located on the side of a transfer electrode, and this cut-out part is positioned on the transfer electrode. Furthermore, a sealing member composed of a resin that includes conductive particles is formed on the peripheral edge parts of the alignment film. In this case, the system is devised so that the transfer electrode is covered by the sealing member. Furthermore, the TFT substrate and counter substrate are pasted together by the sealing member, and the transfer electrode of the TFT substrate and the counter electrode of the counter substrate are connected to each other. Subsequently, a liquid crystal layer is sealed between the TFT substrate and the counter substrate to produce a liquid crystal display device. As a result, a liquid crystal display device with a narrow frame and high display quality can be obtained.

30 Claims, 19 Drawing Sheets

FIG. 10A
FIG. 10B
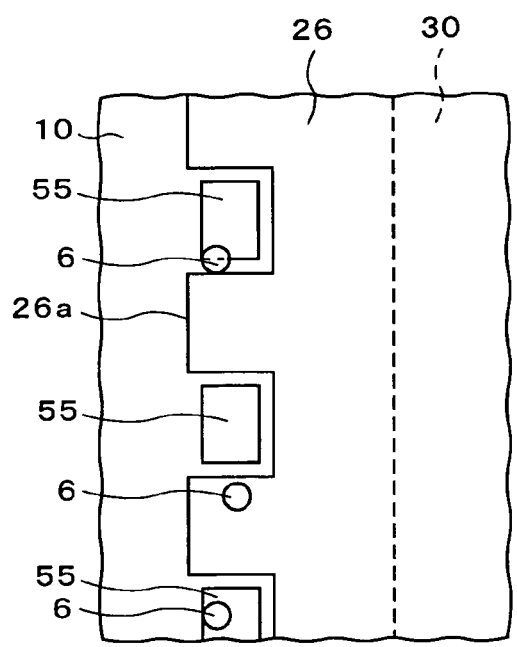
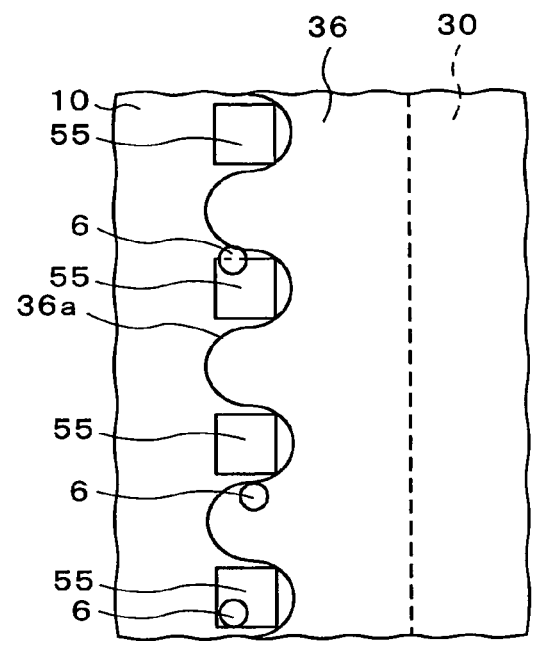

LIQUID CRYSTAL DISPLAY DEVICE AND METHOD FOR MANUFACTURING THE SAME

BACKGROUND OF THE INVENTION

1. Field of the Invention

The present invention relates to a liquid crystal display device in which alignment films are formed on the surfaces of substrates, and a method for manufacturing the same, and more particularly relates to a liquid crystal display device in which thin film transistors are formed as switching elements, and a method for manufacturing the same.

2. Description of the Related Art

In a general liquid crystal display device, a voltage is applied to a liquid crystal layer sealed between a pair of substrates disposed facing each other, and images are displayed by varying the transmissivity of the light passing through this liquid crystal layer so that the relative brightness is controlled. For example, in the case of a liquid crystal display device using an active matrix driving system, a TFT substrate on which TFTs (thin film transistors) are formed and a counter substrate on which a transparent electrode is formed are disposed so that the surface on which the TFTs are formed and the surface on which the transparent electrode is formed face each other, and these parts are connected to each other via a conductive material. Furthermore, the TFT substrate and counter substrate are bonded to each other by a sealing member which is formed so that this sealing member surrounds the display region, and the liquid crystal layer is sealed in a space that is formed by the TFT substrate, counter substrate and sealing member. Moreover, alignment films that are used to align the orientation direction of the liquid crystal in the liquid crystal layer in a fixed direction are respectively formed on the surfaces of the respective substrates. Generally, the method that is used to form these alignment films is a flexo printing method in which an alignment plate on which protruding parts are formed on the portions where alignment films are to be formed is coated with an alignment agent, and this alignment agent is transferred to the respective substrates by printing.

In recent years, furthermore, there has been an increased demand for compact liquid crystal display devices, and at the same time, there has been a demand for smaller frame portions surrounding the image regions, i.e., a demand for narrower frames. One method for achieving narrower frames in liquid crystal display devices is a method in which an electrical conductivity electrode (transfer electrode) which is used to obtain electrical conductivity between the substrates is mounted in a region in contact with the sealing member on the surface of the TFT substrate, conductive particles are added to the sealing agent that forms the sealing member, and the TFT substrate and counter substrate are electrically connected to each other via the transfer electrode and sealing member. As a result, substrate connecting parts composed of a conductive material or the like mounted further to the outside than the sealing member become unnecessary; accordingly, the frame of the liquid crystal display device can be made narrower. However, in cases where such a structure is used for the liquid crystal display device, the formation of an alignment film on the surface of the transfer electrode must be avoided in order to ensure electrical conductivity with the sealing member. Accordingly, in cases where the alignment films are formed by printing, it is necessary to form a fixed gap between the peripheral edge of the display region and the inside edge of the sealing member in accordance with the printing precision of the alignment film. Furthermore, the alignment plate precision, printing position precision, and the like may be cited as factors that determine the printing precision of the alignment film.

In the past, therefore, in order to solve these problems, a method has been proposed in which an alignment film is formed over the entire surface of the substrate, and specified portions of this alignment film are then removed as necessary (for example, see Japanese Laid-Open Patent Application Nos. 2001-183690, 11-2820, and 2000-47241). FIG. 19 is a sectional view showing the electrically conducting part of the liquid crystal display device in Japanese Laid-Open Patent Application No. 2001-183690 (Prior Art 1). In the liquid crystal display device 100 of Japanese Laid-Open Patent Application No. 2001-183690, external wiring 105 formed on a transparent substrate 101 and internal wiring 107 formed on a transparent substrate 102 are connected to each other by conductive particles 104 included in a sealing member 103, as shown in FIG. 19. These conductive particles 104 are particles in which a conductive layer 104b composed of a metal is formed on the surfaces of plastic particles 104a. Furthermore, in the liquid crystal display device 100, respective alignment films 106 and 108 are formed on the external wiring 105 and internal wiring 107, and the conductive particles 104 break through these alignment films 106 and 108 and come into contact with the external wiring 105 and internal wiring 107.

Thus, in the liquid crystal display device 100 of Japanese Laid-Open Patent Application No. 2001-183690, the conductive particles 103 break through the alignment films 106 and 108 and cause electrical conductivity of the external wiring 105 and internal wiring 107. There is therefore no need to avoid the electrically conducting parts in forming the alignment films. As a result, there are no restrictions on the printing positions of the alignment films, so that the frame of the liquid crystal display device can be narrowed. Furthermore, Japanese Laid-Open Patent Application No. 2001-183690 also discloses a method in which alignment films 106 and 108 are formed over the entire surface, and the alignment films in the electrically continuous portions are then removed by plasma ashing or the like.

FIG. 20 is a sectional view showing the electrically conducting part of the liquid crystal display device described in Japanese Laid-Open Patent Application No. 11-2820 (Prior Art 2). In the liquid crystal display device 110 of Japanese Laid-Open Patent Application No. 11-2820, a TFT substrate 111 in which an external connection terminal 113 is formed on one surface, and a counter substrate 112 in which a transparent electrode 114 is formed on one surface, are disposed so that the surfaces on which the external connection terminal 113 and transparent electrode 114 are formed face each other, and a liquid crystal layer 120 is sealed between these substrates, as is shown in FIG. 20. Furthermore, a plurality of inter-cell spacers 121 are disposed between the TFT substrate 111 and the counter substrate 112, and a sealing member 117 is formed around the periphery of the TFT substrate 111 and counter substrate 112. Moreover, in the TFT substrate 111 and counter substrate 112, alignment films 115 and 116 are respectively formed over the entire surface of each substrate, and conductive spacers 119 dispersed in an epoxy resin 118 break through the alignment films 115 and 116, so that the external connection terminal 113 and transparent electrode 114 are connected to each other. In this liquid crystal display device 110, the alignment films 115 and 116 are pierced by the conductive spacers 119 which are harder than the alignment films 115 and 116, and which have projections on the periphery. The external connection terminal 113 and the transparent electrode 114 are electrically connected, making patterning of the alignment films unnecessary and dispensing with the design margin of the printing plate so that the display area can be enlarged.

FIG. 21 is a sectional view showing the electrically conducting parts of the liquid crystal display device described in Japanese Laid-Open Patent Application No. 2000-47241 (Prior Art 3). In the liquid crystal display device 130 of Japanese Laid-Open Patent Application No. 2000-47241, as is shown in FIG. 21, a TFT substrate and a counter substrate are disposed facing each other, and a liquid crystal layer 144 is sealed between these substrates. Furthermore, a plurality of inter-cell spacers 143 are disposed between the TFT substrate and counter substrate, and a sealing member 142 is formed around the periphery of the TFT substrate and counter substrate. In the TFT substrate in this liquid crystal display device 130, TFTs 133 are formed on top of a transparent substrate 131, and a common terminal 136 is formed on top of an insulating layer 134 that is formed so as to cover the TFTs 133. Pixel electrodes 137 hat are electrically connected with TFTs 133 are formed on top of an insulating layer 135, which itself is formed on top of the insulating layer 134. Furthermore, an alignment film 138 is formed so as to cover portions other than the common terminal 136. Furthermore, in the counter substrate, a common electrode 139 is formed on top of a transparent substrate 132, and an alignment film 140 is formed so as to cover portions other than the electrically conducting parts. Moreover, the common terminal 136 and common electrode 139 are connected to each other by a conductive resin 141. In this liquid crystal display device 130, the alignment films 138 and 140 are formed on the entire surfaces of the respective substrates by a rotary coating method. The region immediately above the common terminal 136 on the surface of the alignment film 138 is then coated with the conductive resin 141, the TFT substrate and the counter substrate are pasted together, and the common terminal 136 and common electrode 139 are irradiated with an Nd-YAG laser so that the alignment films 138 and 140 on these parts are melted and removed.

Disclosures also exist (for example, see Japanese Laid-Open Patent Application Nos. 10-268310, 2000-47228, and 2003-295191) regarding liquid crystal display devices in which a portion of the sealing member is formed on an alignment film in order to prevent thickness defects from being caused in display cells by irregular thickness of the alignment films and to prevent the alignment films and sealing member from peeling. FIG. 22A is a plan view showing the display panel of the liquid crystal display device described in Japanese Laid-Open Patent Application No. 2000-47228 (Prior Art 4). FIG. 22B is a sectional view along line A-A in FIG. 22A. The display panel 150 of the liquid crystal display device of Japanese Laid-Open Patent Application No. 2000-47228 has a lower substrate in which a transparent electrode 153 is formed on a transparent substrate 151, and in which an alignment film 155 is formed so as to cover this transparent electrode 153. The panel further has an upper substrate in which a transparent electrode 154 is formed on a transparent substrate 152, and in which an alignment film 156 is formed so as to cover this transparent electrode 154. The two substrates are disposed so that the surfaces on which the alignment films 155 and 156 are formed face each other, as is shown in FIGS. 22A and 22B. Further disposed between the upper substrate and lower substrate are a plurality of spacers 158a and a sealing member 157 that is formed so as to surround the display region and has a liquid crystal injection port 159 formed in one part. The gap between the upper and lower substrates is maintained at a constant value by the sealing member 157 and spacers 158. Furthermore, a liquid crystal layer 160 is sealed inside the part surrounded by the sealing member 157 between the alignment film 155 and alignment film 156. In this liquid crystal display panel 150, the sealing member 157 is disposed straddling regions in which the alignment films 155 and 156 are formed and regions in which these alignment films are not formed. Generation of gas bubbles when the liquid crystal is injected can therefore be prevented, and the bonding strength of the sealing member can be improved. Furthermore, in the liquid crystal display device described in Japanese Laid-Open Patent Application No. 2003-295191 (Prior Art 5), the sides parallel to the rubbing direction in the alignment films are formed in a non-linear shape such as a buckled shape, sawtooth shape, wave shape, C shape or the like.

However, the following problems have been encountered in the abovementioned prior art. Specifically, the following problem arises in the case of methods in which electrical conductivity of the upper and lower substrates is obtained by piercing the alignment films by means of conductive particles as in the liquid crystal display devices of Japanese Laid-Open Patent Application Nos. 2001-183690 and 11-2820. Namely, a sufficient electrical conductivity cannot be obtained using the fine electroconductive particles that are currently in common use and are obtained by forming a metal thin film on the surfaces of plastic particles. The following Table 1 shows the electrical conductivity resistance of the upper and lower substrates with respect to the overlap pressure of the upper and lower substrates when an alignment film was present on the transfer electrode and when no alignment film was present on the transfer electrode in a case where the liquid crystal display device of Japanese Laid-Open Patent Application No. 2001-183690 was manufactured by forming a polyimide thin film with a pencil hardness of 2H as an alignment film. The material for the film was prepared by a method in which conductive fine particles formed by coating the surfaces of plastic fine particles, which were primarily composed of diphenyl benzene and had a particle size of 5 μm, with a nickel-gold alloy were added to the sealing agent at the rate of 0.1 mass %.

TABLE 1

| Overlap pressure (kPa) | Vertical circuit resistance (Ω) | |
|---|---|---|
| | With alignment film | Without alignment film |
| 30 | In excess of $2 \times 10^7$ | 7.3 |
| 45 | In excess of $2 \times 10^7$ | 7.6 |
| 80 | In excess of $2 \times 10^7$ | 7.4 |

As is shown in the abovementioned Table 1, in cases where conductive particles obtained by forming a metal thin film on the surfaces of plastic particles are used, forming an alignment film on the transfer electrode makes it difficult to achieve electrical conductivity between the upper and lower substrates even if the overlap pressure is increased to a high value. This problem can be solved by using high-hardness conductive particles such as metal particles or the like. However, in cases where high-hardness conductive particles are used, forming a flattening film composed of an organic film on the TFT substrate in order to alleviate the step differences causes the flattening film to be dented by the conductive particles so that the amount of deformation increases, thus making it impossible to obtain a uniform cell gap. Furthermore, depending on the overlap pressure, there is a danger that this may lead to destruction of the ITO (indium tin oxide) film that constitutes the transfer electrode.

Furthermore, a method in which an alignment film is formed over the entire surface, and the alignment film on the transfer electrode is then removed by plasma ashing, has been proposed in Japanese Laid-Open Patent Application No. 2001-183690 as a means of solving the abovementioned problem. In this case, however, the productivity drops and the cost is increased as a result of the need to prepare a mask to protect the display region, the need for a positioning mechanism to position the mask, and the addition of an ashing process. The following problem also arises in cases where the abovementioned flattening film composed of an organic film is formed. Namely, the flattening film is also removed by this ashing.

Furthermore, the liquid crystal display device 130 of Japanese Laid-Open Patent Application No. 2000-47241 is a conventional liquid crystal display device in which an electrically conducting part composed of a conductive resin 141 is mounted on the outside of the sealing member 142. However, there are cases where a method for removing the alignment film of the electrically conducting part by melting with a laser is applied to a narrow-frame liquid crystal display device in which a transfer electrode is mounted on the TFT substrate and in which electrical conductivity of the counter substrate and TFT substrate is obtained via this transfer electrode and via a sealing member that includes conductive particles. In such cases, the heat resistance of the sealing member is generally inferior to that of the alignment film, causing the sealing member to be melted by the laser. Another problem is that particles of the sealing member, the alignment film, or the transfer electrode scatter around and remain inside the cell, producing display defects.

Furthermore, in a narrow-frame liquid crystal display device in which the counter substrate and TFT substrate are made electrically continuous via the abovementioned transfer electrode and the sealing member that includes conductive particles, there are cases where the sealing member is disposed so as to straddle regions in which an alignment film is formed and regions in which an alignment film is not formed, and a transfer electrode is mounted in a region on the surface of the TFT substrate that is in contact with the sealing member, as in the conventional liquid crystal display devices disclosed in Japanese Laid-Open Patent Application Nos. 2000-47228, 2003-295191, and 10-268130. In such cases, electrical conductivity is obtained between the counter substrate and TFT substrate, but if a flattening film composed of an organic film is formed on the TFT substrate, the surface roughness of the transfer electrode is decreased, and the adhesive strength of the sealing member drops.

FIGS. 23A and 23B are sectional views showing the method used to test the adhesive strength of the sealing member in the order of the processes involved. As is shown in FIG. 23A, the following elements are bonded by a sealing member 167 that includes conductive particles and a gap material: a substrate in which an inter-layer insulating film 163 whose uppermost layer is an organic flattening film is formed on top of a glass substrate 161 so as to cover the electrode layer 162, a transfer electrode 164 that consists of ITO and is connected to the electrode layer 162 via contact holes is formed on top of the inter-layer insulating layer 163, and a substrate in which a counter electrode 166 composed of ITO is formed on top of a glass substrate 165. The transfer electrode 164 and the counter electrode 166 are connected to each other via this sealing member 167, after which these two substrates are subjected to a tension test. As a result, interfacial peeling occurs only in portions of the transfer electrode 164 formed on top of the inter-layer insulating film 163, and destruction occurs inside the sealing member 167 in other portions, as is shown in FIG. 23B.

One of the reasons for this is the difference in the surface roughness of the respective electrodes. Table 2 below shows the surface roughness of the region A of the transfer electrode 164 that is formed on top of the inter-layer insulating film 163, the surface roughness of the region B of the transfer electrode 164 that is formed on top of the electrode layer 162, and the surface roughness of the region C of the counter electrode 166. Furthermore, the surface roughness values shown in the following Table 2 are values obtained by standardizing results measured by means of an AFM (atomic force microscope), with the value for region A taken as 100. The adhesive strength values for the respective regions are also shown in the following Table 2. The adhesive strength values indicated in the following Table 2 are shown as x in cases where interfacial peeling occurred, and are shown as O in cases where internal destruction occurred.

TABLE 2

| Measurement region | Adhesive strength | Surface roughness Ra (relative value) |
|---|---|---|
| A | X | 100 |
| B | ◯ | 324 |
| C | ◯ | 146 |

As is shown in the above Table 2, the portions of the transfer electrode 164 formed on top of the inter-layer insulating film 163, i.e., the portions formed on top of an organic flattening film, shows a small surface roughness, and therefore shows a low adhesive strength. Accordingly, in order to improve the adhesive strength of the sealing member of the liquid crystal display device, it is advisable to minimize the size of the transfer electrode formed on top of the organic flattening layer. However, considering the printing precision of the alignment films, it is difficult to achieve any further reduction in the size of the electrode regions.

SUMMARY OF THE INVENTION

It is an object of the present invention to provide a liquid crystal display device having a narrow frame and a high display quality, and a method for manufacturing the same.

The liquid crystal display device according to the first aspect of the present invention is a liquid crystal display device having a liquid crystal layer sealed between a first substrate on which pixel circuits are formed and a second substrate on which a counter electrode is formed, and the abovementioned first and second substrates being connected to each other via a sealing member, wherein the abovementioned first substrate has a wiring layer which is connected to the abovementioned pixel circuits, a conducting electrode which is mounted on the surface facing the abovementioned liquid crystal layer and which is connected to the abovementioned wiring layer, and a first alignment film which is mounted on the surface facing the abovementioned liquid crystal layer and which is used to align the liquid crystal molecules of the abovementioned liquid crystal layer; a cut-out part is formed in the abovementioned first alignment film in at least one portion of the part which is mounted on top of the abovementioned conducting electrode, the abovementioned sealing member is formed so as to cover the conducting electrode; and the abovementioned conducting electrode and the sealing member make contact in the abovementioned cut-out part of the first alignment film.

The liquid crystal display device according to the second aspect of the present invention is a liquid crystal display device having a liquid crystal layer sealed between a first substrate on which pixel circuits are formed and a second substrate on which a counter electrode is formed, and the abovementioned first and second substrates being connected to each other via a sealing member composed of a resin material that includes conductive particles, wherein the abovementioned first substrate has a wiring layer which is connected to the abovementioned pixel circuits, an insulating layer which is formed on the surface facing the abovementioned liquid crystal layer so as to cover the pixel circuits and wiring layer, a conducting electrode which is mounted on the abovementioned insulating layer and which is connected to the abovementioned wiring layer, and a first alignment film which is disposed on top of the abovementioned insulating layer so as to cover the region directly above the abovementioned pixel circuit and which aligns the liquid crystal molecules of the liquid crystal layer; a cut-out part is formed in the alignment film in the end part located on the side of the abovementioned conducting electrode; this cut-out part is positioned on the conducting electrode, the abovementioned sealing member is formed so as to cover the conducting electrode and be in contact with at least a part of the abovementioned counter electrode; the conducting electrode and the sealing member are in contact with each other in the cut-out part of the first alignment film; and the conducting electrode and the counter electrode are connected to each other via the abovementioned sealing member.

According to the first and second aspects of the present invention, since a cut-out part is formed in the end part of the first alignment film formed on the side of the conducting electrode, even if the area of the conducting electrode is reduced, a stable electrical conductivity can be obtained between the conducting electrode and the counter electrode. Furthermore, since the restrictions on the printing precision at the time of alignment film formation can be reduced, the size of the display region can be increased, and the frame can be narrowed compared to a conventional liquid crystal display device.

The amplitude of the cut-out part in these liquid crystal display devices may be greater than the width of the conducting electrode. As a result, the electrical conductivity between the conducting electrode and the counter electrode can be stabilized even further, and the adhesion area between the conducting electrode and the sealing member can be reduced, so that the sealing strength of the substrates can be increased. As a result, the reliability is improved.

The liquid crystal display device according to the third aspect of the present invention is a liquid crystal display device having a liquid crystal layer sealed between a first substrate on which pixel circuits are formed and a second substrate on which a counter electrode is formed, and the abovementioned first and second substrates being connected to each other via a sealing member, wherein the abovementioned first substrate has a wiring layer which is connected to the abovementioned pixel circuits, a plurality of electrodes used for electrical conductivity which are locally disposed on the surface facing the abovementioned liquid crystal layer and which are respectively connected to the abovementioned wiring layer, and a first alignment film which is disposed on the surface facing the abovementioned liquid crystal layer and which aligns the liquid crystal molecules of the liquid crystal layer; and the portion of the end part of the first alignment film facing the conducting electrode that is located directly above the conducting electrode forms a cut-out part, and the abovementioned sealing member is formed on the end part of the alignment film facing the conducting electrode so as to cover the abovementioned conducting electrode.

The liquid crystal display device according to the fourth aspect of the present invention is a liquid crystal display device having a liquid crystal layer sealed between a first substrate on which pixel circuits are formed and a second substrate on which a counter electrode is formed, and the abovementioned first and second substrates being connected to each other via a sealing member composed of a resin material that includes conductive particles, wherein the abovementioned first substrate has a wiring layer which is connected to the abovementioned pixel circuits, an insulating layer which is formed on the surface facing the abovementioned liquid crystal layer so as to cover the abovementioned pixel circuits and wiring layer, a plurality of electrodes used for electrical conductivity which are locally disposed on the abovementioned insulating layer and which are respectively connected to the abovementioned wiring layer, and a first alignment film which is disposed on the abovementioned insulating layer so as to cover the region immediately above the abovementioned pixel circuits and which aligns the liquid crystal molecules of the abovementioned liquid crystal layer; that portion of the end part of abovementioned first alignment film on the side of the conducting electrode which is immediately above the conducting electrode forms a cut-out part; the abovementioned sealing member is in contact with at least a portion of the abovementioned counter electrode and is formed on the end part of the abovementioned alignment film on the side of the conducting electrode so as to cover the conducting electrode; and the abovementioned conducting electrode and counter electrode are connected to each other via the sealing member.

In the third and fourth inventions of the present invention, a plurality of electrodes used for electrical conductivity are formed locally, and these electrodes used for electrical conductivity are disposed in a cut-out part of the first alignment film. Furthermore, the system is arranged so that no first alignment film is formed on the conducting electrode. Accordingly, the electrical conductivity between the conducting electrode and the counter electrode can be stabilized. Furthermore, since the restrictions on the printing precision during alignment film formation can be reduced, the size of the display region can be increased, and the frame can be narrowed compared to that of a conventional liquid crystal display device. Moreover, since the bonding area between the conducting electrode and the sealing member is reduced, the sealing strength of the substrates can be increased, so that the reliability is improved.

In the liquid crystal display devices according to the abovementioned second and fourth aspects, the abovementioned insulating layer may have an inter-layer insulating film, and a flattening film that is formed on top of this inter-layer insulating film; and the abovementioned flattening film may be formed from a resin material. As a result, the substrate surfaces can be further flattened, so that the cell gap is uniform, and the display quality is improved. In this case, the abovementioned sealing member may contact the conducting electrode, the flattening film, and the first alignment film.

Plastic particles whose surfaces are covered by a metal thin film may be used as the abovementioned conductive particles in the liquid crystal display devices according to the second and fourth aspects. As a result, even in cases where the flattening film is formed by a resin, the flattening film does not undergo deformation, so that a uniform cell gap can be obtained.

In the abovementioned pixel circuits in the liquid crystal display devices according to the first through fourth aspects, thin film transistors may be mounted for each of the abovementioned pixels. Furthermore, the amplitude of the abovementioned cut-out part can be made smaller than the width of the sealing member. As a result, since the thick film region formed on the end part of the first alignment film is not exposed inside the cell, the film thickness of the alignment film and the cell gap can be made uniform throughout the cell. As a result, the transmissivity of the liquid crystal layer is uniform over the entire surface of the display region, so that the display quality is improved.

The second alignment film may also be disposed at a position in which the surface of the second substrate that faces the liquid crystal layer is opposite the first alignment film, in which case a cut-out portion can be formed in the end portion of the second alignment film on the side facing the conducting electrode. Furthermore, the cut-out portion may have a triangular shape.

The method for manufacturing a liquid crystal display device according to the fifth aspect of the present invention is a method for manufacturing a liquid crystal display device having a liquid crystal layer sealed between a first substrate provided with a conducting electrode in mutual connection with a wiring layer connected to a pixel circuit, and a second substrate on which a counter electrode is formed, and the abovementioned first and second substrates being connected to each other via a sealing member, the method comprising forming an alignment film on the upper end part of the abovementioned first substrate using an alignment plate in which a cut-out part is formed so that at least a portion of the covering cut-out part is positioned on the abovementioned conducting electrode; performing a rubbing treatment on the abovementioned alignment film; forming a sealing member so that this sealing member covers the conducting electrode; and pasting the abovementioned first substrate and second substrate together, with the abovementioned sealing member interposed therebetween.

The method for manufacturing a liquid crystal display device according to the sixth aspect of the present invention comprises forming pixel circuits and a wiring layer connected to these pixel circuits on an insulating substrate, then forming an insulating layer so that this insulating layer covers the abovementioned pixel circuits and wiring layer, and forming a conducting electrode which is connected to the abovementioned wiring layer on a portion of the abovementioned insulating layer that is located further to the outside than the region directly above the abovementioned pixel circuits, so that a first substrate is obtained; printing an alignment film on the abovementioned insulating layer using an alignment plate in which a cut-out part is formed in the end part, so that the region directly above the abovementioned pixel circuits is covered, and at least a portion of the cut-out part is positioned on the abovementioned conducting electrode; performing a rubbing treatment on the abovementioned alignment film; coating the abovementioned conducting electrode with a resin that includes conductive particles so that a sealing member is formed; pasting the first substrate on which this sealing member is formed and a second substrate on which a counter electrode is formed together via the abovementioned sealing member; and sealing a liquid crystal layer between the abovementioned first substrate and second substrate.

According to the fifth and sixth aspects of the present invention, since an alignment film is printed on the surface of the first substrate using an alignment plate that has a cut-out part formed in the end part, an alignment film in which a cut-out part is formed in the end part can be formed without increasing the number of steps. Furthermore, since a cut-out part is formed in the end part of the alignment film, the thick film region formed in the end part of the alignment film can be reduced, so that the generation of dust in the rubbing step can be prevented.

In the present invention, since a cut-out part is formed in the end part of the alignment film facing the conducting electrode, the electrical conductivity between the conducting electrode and the counter electrode can be stabilized. Furthermore, the restrictions on the printing precision can be reduced, so that a liquid crystal display device with a narrow frame and superior display quality can be obtained.

BRIEF DESCRIPTION OF THE DRAWINGS

FIGS. 10A and 10B are enlarged plan views showing the TFT substrate of a liquid crystal display device constituting a modification of the second embodiment of the present invention;

DESCRIPTION OF THE PREFERRED EMBODIMENTS

Figure 1:
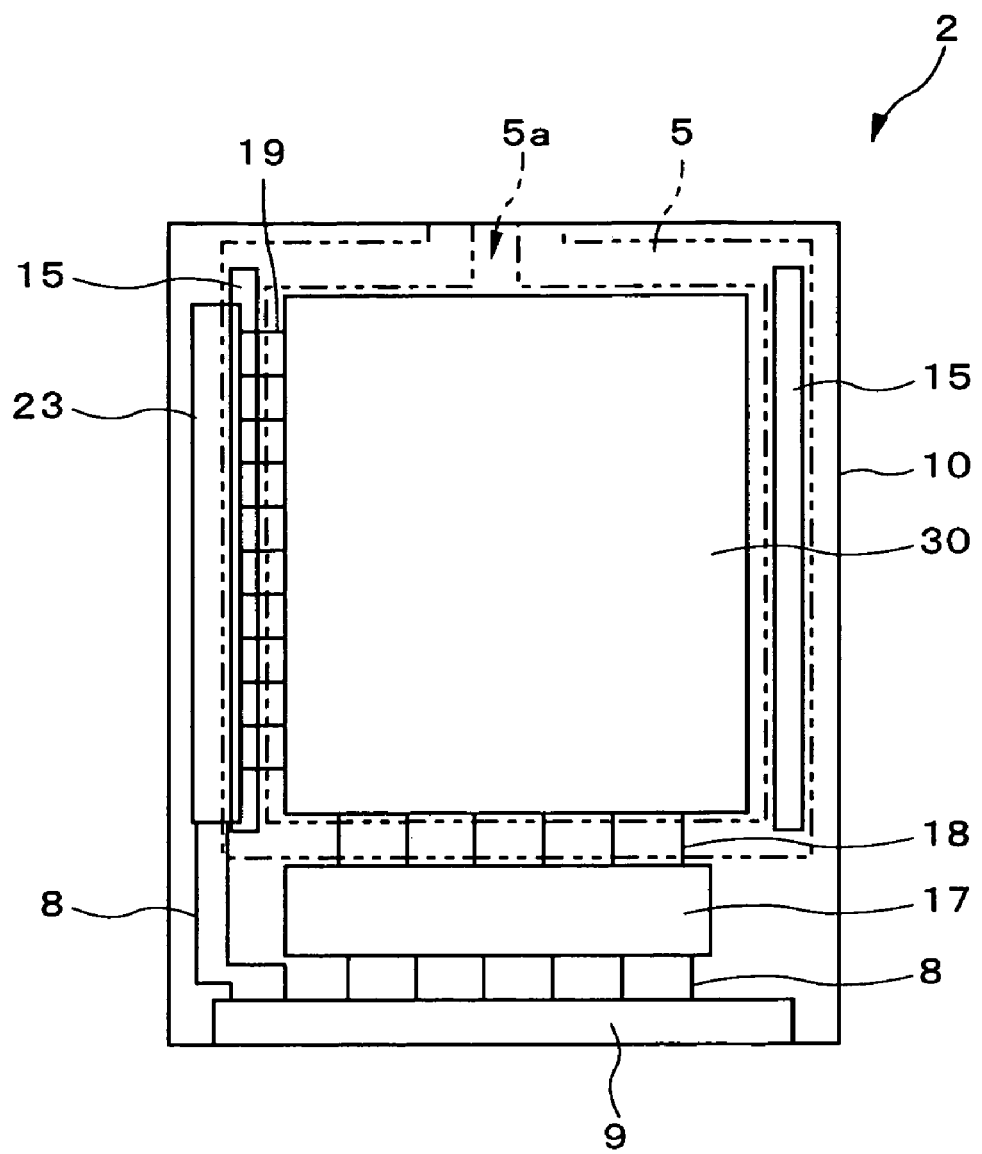
FIG. 1 is a plan view showing the TFT substrate of the liquid crystal display device of a first embodiment of the present invention.
Figure 2:
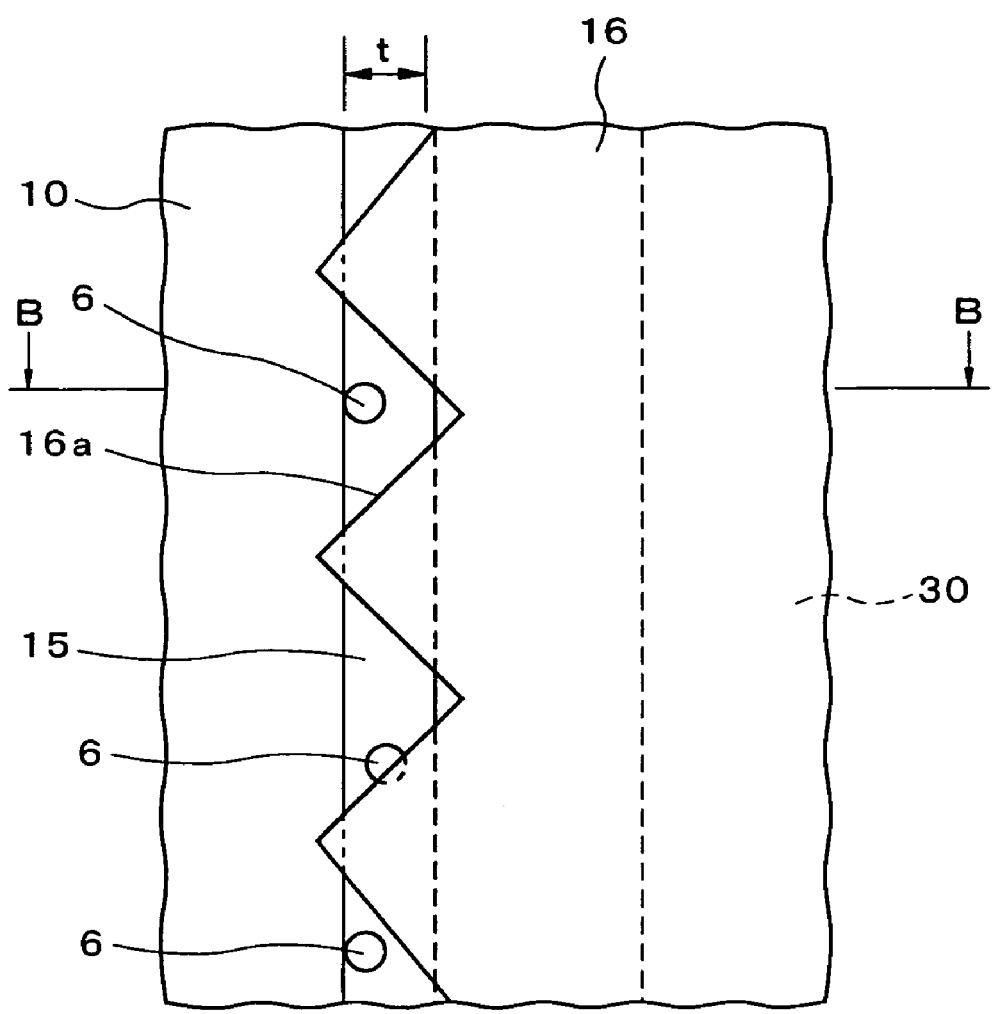
FIG. 2 is an enlarged plan view of the TFT substrate shown in FIG. 1.
Figure 3:
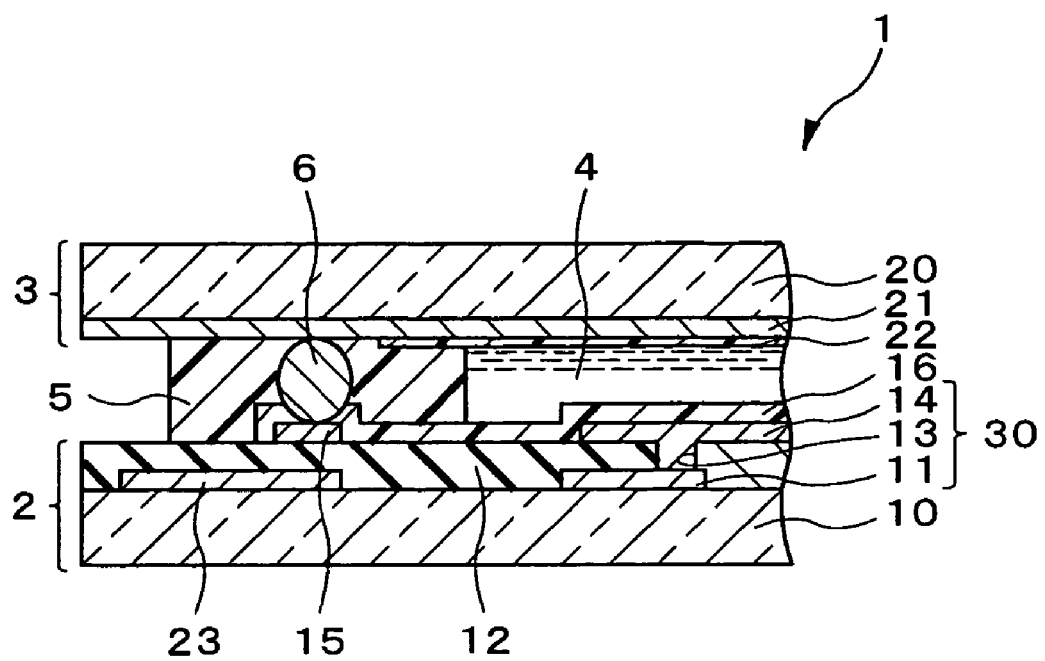
FIG. 3 a sectional view showing the electrically conducting parts of the liquid crystal display device of the first embodiment of the present invention, and corresponds to a sectional view along line B-B in FIG. 2.

Liquid crystal display devices constituting embodiments of the present invention will be described in concrete terms below with reference to the attached figures. First, the liquid crystal display device of a first embodiment of the present invention will be described. FIG. 1 is a plan view showing the TFT substrate of the liquid crystal display device of the present embodiment, and FIG. 2 is an enlarged view of the same. Furthermore, FIG. 3 is a sectional view showing the electrically conducting parts of the liquid crystal display device of the present embodiment, and corresponds to a sectional view along line B-B in FIG. 2. In order to facilitate viewing of the figures, the insulating layer is omitted from FIG. 1, and only the conductive particles 6, transparent electrode 10, transfer electrode 15, alignment film 16, and pixel array 30 are shown in FIG. 2. As is shown in FIGS. 1 through 3, the liquid crystal display device 1 of the present embodiment is constructed as follows. The TFT substrate 2 and a counter substrate 3 are disposed parallel to each other via an interposed sealing member 5 in which a liquid crystal injection port 5a is formed, and a liquid crystal layer 4 composed of (for example) a TN (twist nematic) liquid crystal having a twist angle of 90° is sealed between the two substrates.

A transparent substrate 10 composed of glass or the like is mounted on the TFT substrate 2 in this liquid crystal display device 1, and a plurality of polysilicon thin film transistors (pixel TFTS) 11 used to drive the pixels are formed in the form of a matrix on the surface of the transparent substrate 10 on the side facing the counter substrate 3. Furthermore, an insulating layer 12 is formed on the pixel TFTs 11, and a plurality of pixel electrodes 14 composed of a transparent conductive material such as ITO or the like are formed, for example, on top of the insulating layer 12. These pixel electrodes 14 are connected to the pixel TFTs 11 via contact holes 13 that are formed so that these holes pass through the insulating layer 12. A pixel array 30 is constructed from the pixel TFTs 11, contact holes 13, pixel electrodes 14, storage capacitors (not shown in the figures) and the like.

Furthermore, a gate line drive circuit 23 which is connected to the pixel array 30 via gate lines 19 and which controls the pixel array 30, as well as a data line drive circuit 17 which is connected to the pixel array 30 via data lines 18 and which supplies video signals to the pixel array 30, are disposed on the surface of the transparent substrate 10 on the side facing the counter substrate 3, and an insulating layer 12 is also formed on top of these circuits. Moreover, the gate line drive circuit 23 and data line drive circuit 17 are connected via terminal wiring 8 to terminal pads 9 formed on the insulating layer 12. Electrical wiring (not shown in the figures) which supplies control signals, power and the like to the gate line drive circuit 23, data line drive circuit 17, and pixel array 30 is connected to these terminal pads 9. As a result, for example, electrical connections are made with external devices using flexible cables.

Furthermore, a transfer electrode 15, which is a conducting electrode that connects the TFT substrate 2 and counter substrate 3 to each other, is formed on a portion of the surface of the TFT substrate 2 that is located further to the outside than the pixel array 30. Moreover, an alignment film 16 composed of a polyimide which covers the pixel array 30 and determines the initial aligned state of the liquid crystal layer 4 is disposed on the surface of the TFT substrate 2 that contacts the liquid crystal layer 4. This alignment film 16 is formed so that at least a portion of the end edge located on the side of the transfer electrode 15 is positioned on the transfer electrode 15, and, as is shown in FIG. 2, a cut-out part 16a is formed in at least the end part that is disposed on the transfer electrode 15.

In the counter substrate 3, a counter electrode 21 composed of a transparent conductive material such as ITO or the like is formed on a transparent substrate 20, and an alignment film 22 composed of a polyimide which determines the initial aligned state of the liquid crystal layer 4 is formed, for example, on the surface of the counter substrate 3 that is in contact with the liquid crystal layer 4. This alignment film 22 is formed so that the edge part located on the side of the counter electrode 21 is positioned on the counter electrode 21, and a cut-out part having the same shape as the alignment film 16 is formed in at least the edge part that is disposed on the counter electrode 21. Furthermore, in the counter substrate 3, red, green and blue filters and a black matrix composed of a metal thin film or resin may be formed in the underlayer beneath the counter electrode 21.

Furthermore, the TFT substrate 2 and the counter substrate 3 are bonded and fastened parallel to each other by means of a sealing member 5 which is disposed on the peripheral edge parts of the alignment films 16 and 22 so as to surround the pixel array 30, and the transfer electrode 15 that is disposed on the TFT substrate 2 is completely covered by this sealing member 5. For example, the sealing member 5 is a member that is formed by dispersing conductive particles 6 in a thermosetting epoxy resin, ultraviolet curable epoxy resin, or ultraviolet curable acrylic resin. Furthermore, metal particles or particles obtained by coating the surfaces of plastic particles or glass particles with a metal material such as nickel, gold, or the like can, for example, be used as the conductive particles 6. The conductive particles 6 directly contact the portions of the transfer electrode 15 that are not covered by the alignment film 16, and also contact the portions of the counter electrode 21 that are not covered by the alignment film 22, thus ensuring electrical conductivity between these electrodes. Furthermore, a gap adjustment material that maintains the gap between the substrates may be added to the sealing member 5. In the liquid crystal display device 1 of the present embodiment, the size (amplitude) of the cut-out part 16*a* formed in the alignment film 16 is larger than the width t of the transfer electrode 15. However, the present invention is not limited to this option alone, and an arbitrary size may be set. Furthermore, the amplitude of the cut-out part 16*a* may also be set as an arbitrary size with respect to the width of the sealing member 5; however, if the amplitude of the cut-out part 16*a* is set smaller than the width of the sealing member 5, a state is produced in which the peripheral edge parts of the alignment film 16 are not exposed inside the cell. In cases where an organic flattening film is formed on the uppermost layer of the insulating film 12, and a transfer electrode 15 is formed on top of this organic flattening film, if the bonding area between the sealing member 5 and the transfer electrode 15 is large, the electrical conductivity resistance between the transfer electrode 15 and the counter electrode 21 is small. However, since there is a decrease in the bonding strength between the transfer electrode 15 and the sealing member 5, it is necessary to consider the bonding area of these parts. Especially in cases where the frame is narrowed, it is necessary to narrow the width of the sealing member 5. Accordingly, if a certain level of electrical conductivity can be ensured, it is important to improve the bonding strength of the sealing member 5. In such cases, it is desirable to set the amplitude of the cut-out part 16*a* at a value that is greater than the width t of the transfer electrode 15.

Figure 4A:
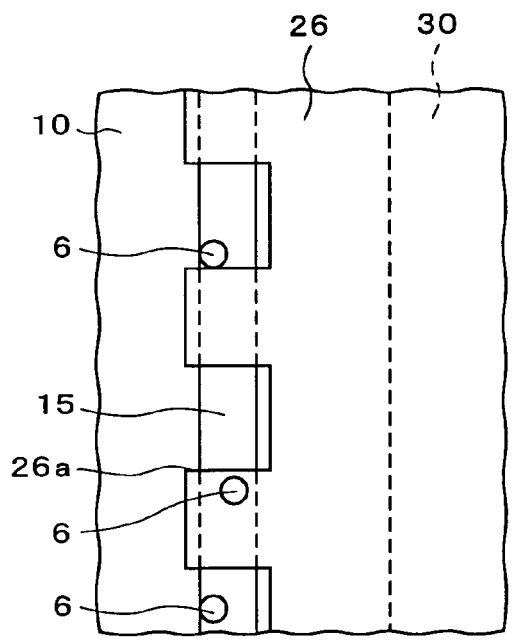
FIGS. 4A and 4B are enlarged plan views showing other shapes of the cut-out part in the alignment film.
Figure 4B:
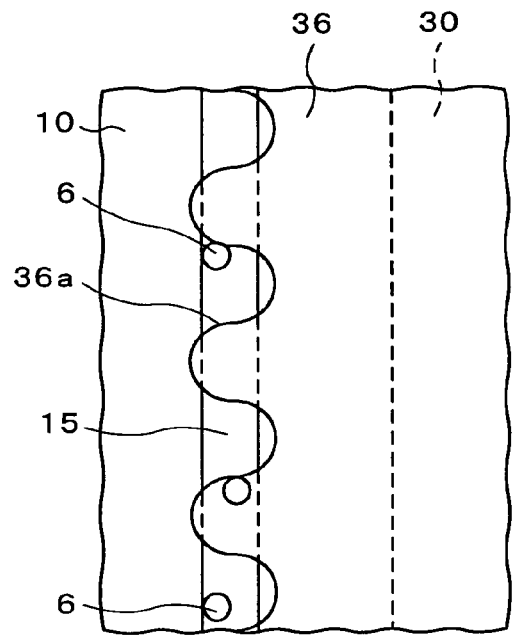

FIGS. 4A and 4B are enlarged plan views showing other shapes of the cut-out part formed in the edge part of the alignment film. Furthermore, in FIGS. 4A and 4B, only the conductive particles 6, transparent substrate 10, transfer electrode 15, alignment film 16, and pixel array 30 are shown in order to facilitate viewing of the figures. Moreover, in FIGS. 4A and 4B, constituent members that are the same as constituent members of the TFT substrate 2 shown in FIG. 2 are labeled with the same reference numerals, and a detailed description of such constituent members is omitted. In the liquid crystal display device 1 of the present embodiment, the shape of the cut-out part 16*a* is a triangular shape. However, the present invention is not limited to this option alone. Besides the triangular shape shown in FIG. 2, it would also be possible to form cut-out parts having various other shapes, e.g., a cut-out part 26*a* having a rectangular shape as in the alignment film 26 shown in FIG. 4A, a cut-out part 36*a* having a semi-circular shape as in the alignment film 36 shown in FIG. 4B, or the like. Providing a cut-out part to the edge part of the alignment film in this manner makes it possible to reduce the effect of the thick film region in the edge part of the alignment film caused by the alignment printing process. The reason for this is that the thick film region is distributed to the surrounding area by placing the flex point of the shape of the cut-out part on the pixel side. However, it is desirable that the shape of the cut-out part in the alignment film be a triangular shape, which has the highest effect in reducing the effect of the thick film region.

Furthermore, in the liquid crystal display device 1 of the present embodiment, the gate line drive circuit 23 is disposed in the region directly beneath the sealing member 5 and in the region disposed farther outside. However, the present invention is not limited to this option alone. It would also be possible to dispose the gate line drive circuit 23 only in the region directly beneath the sealing member 5, in the region directly beneath the sealing member 5 and in the region disposed further inside, or in the region to the inside of the region directly beneath the sealing member 5. The same is true of the data line drive circuit 17.

Figure 5A:
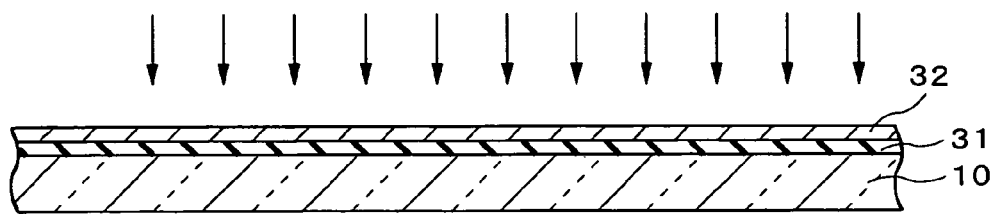
FIGS. 5A through 5E are sectional views showing one example of the manufacturing method used to manufacture the TFT substrate of the liquid crystal display device of the first embodiment of the present invention in the order of the processes involved.

Next, the method used to manufacture the liquid crystal display device 1 of the present embodiment will be described. FIGS. 5A through 5E and 6A through 6D are sectional views which show one example of the method used to manufacture the TFT substrate 2 in the order of the processes involved. First, as is shown in FIG. 5A, an underlying insulating film 31 composed of silicon oxide is formed on a transparent substrate 10 composed of glass or the like; then, an amorphous silicon film 32 is grown on the underlying insulating film 31. As a result of an underlying insulating film 31 thus being formed between the transparent substrate 10 and the amorphous silicon film 32, the effects to which the amorphous silicon film 32 is subjected from the transparent substrate 10 can be reduced. Furthermore, this amorphous silicon film 32 can be annealed and converted into a polysilicon film by irradiation with laser light using an excimer laser or the like. Furthermore, this annealing process can be performed using a laser other than an excimer laser, such as a continuously oscillating CW laser or the like, or a solid-phase growth treatment using a heat treatment can be applied.

Figure 5B:
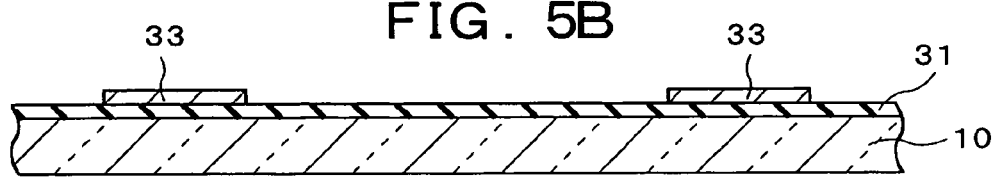
Figure 5C:
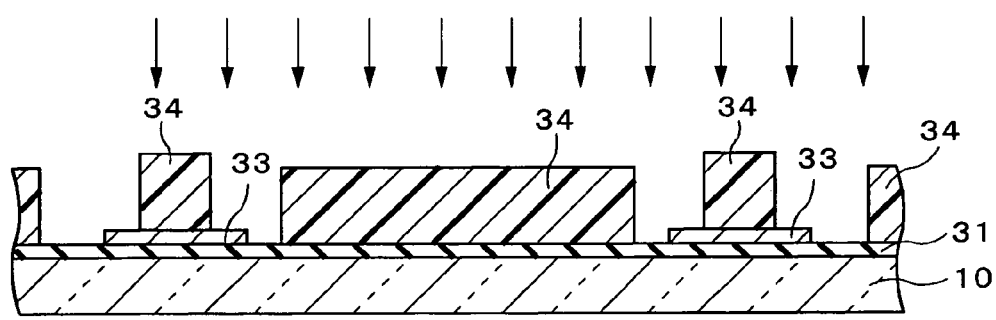
Figure 5D:
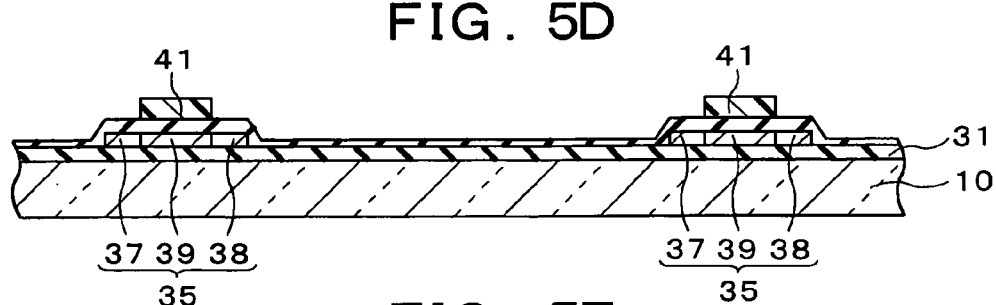

Next, as is shown in FIG. 5B, the polysilicon film 33 is divided into a plurality of regions disposed in the form of a matrix by means of a photolithographic process. Next, as is shown in FIG. 5C, a photo-resist 34 is patterned by means of a photolithographic process, so that opening parts are formed in the regions where the formation of sources and drains of the respective polysilicon films 33 are planned. Then, using the photo-resist 34 as a mask, the respective polysilicon films 33 are doped with phosphorus (P) or boron (B). As a result, as is shown in FIG. 5D, semiconductor layers 35 which have an n channel or p channel source region 37 and drain region 38 are formed. Furthermore, the region between the source region 37 and drain region 38 in each semiconductor layer 35 is a channel region 39. Then, the photo-resist 34 is stripped away, and a gate insulating film 40 is formed so as to cover the underlying insulating film 31 and the respective semiconductor layers 35 formed on top of this insulating film 31. Furthermore, a layer composed of microcrystalline silicon (μ-c-Si) and tungsten silicide (Wsi) is formed, for example, on top of the gate insulating film 40, and this layer is then patterned by a photolithographic process, so that gate electrodes 41 are formed via the gate insulating film 40 in the regions directly above the channel regions 39 in the semiconductor layers 35.

Figure 5E:
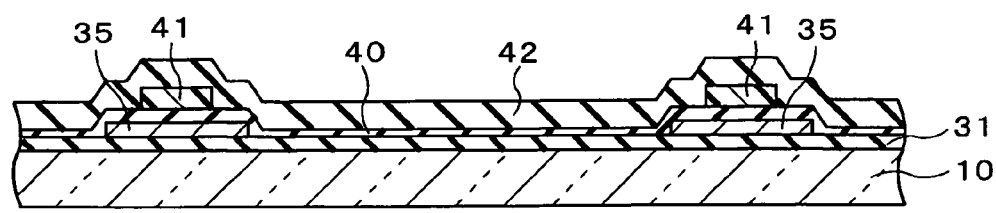
Figure 6A:
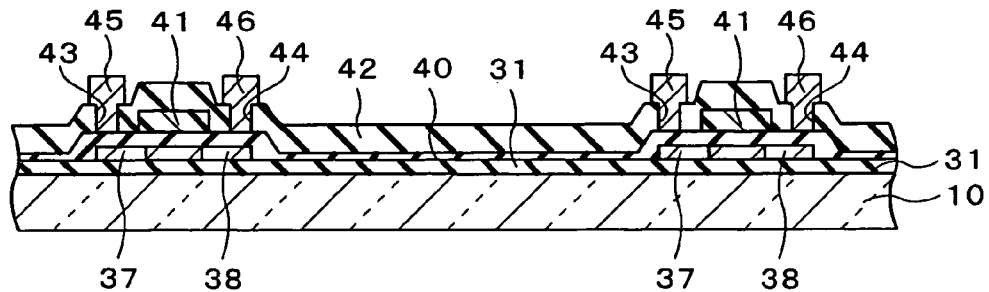
FIGS. 6A through 6D are sectional views showing one example of the method used to manufacture the TFT substrate of the liquid crystal display device of the first embodiment of the present invention in the order of the processes involved, with FIG. 6A showing the process following FIG. 5E.

Next, as is shown in FIG. 5E, an inter-layer insulating film 42 composed of silicon oxide or silicon nitride is formed so as to cover the gate insulating film 40 and gate electrodes 41. Then, as is shown in FIG. 6A, contact holes 43 and 44 which pass through the inter-layer insulating film 42 and gate insulating film 40 are formed in the regions directly above the source regions 37 and drain regions 38, respectively, so that the surfaces of the source regions 37 and drain regions 38 are exposed. A metal film composed of aluminum or the like is formed by a sputtering method or the like inside the contact holes 43 and 44 and on the surface of the inter-layer insulating film 42, and this metal film is subsequently patterned to form a plurality of source electrodes 45 which are electrically connected to the source regions 37, and a plurality of drain electrodes 46 which are electrically connected to the drain regions 38.

Figure 6B:
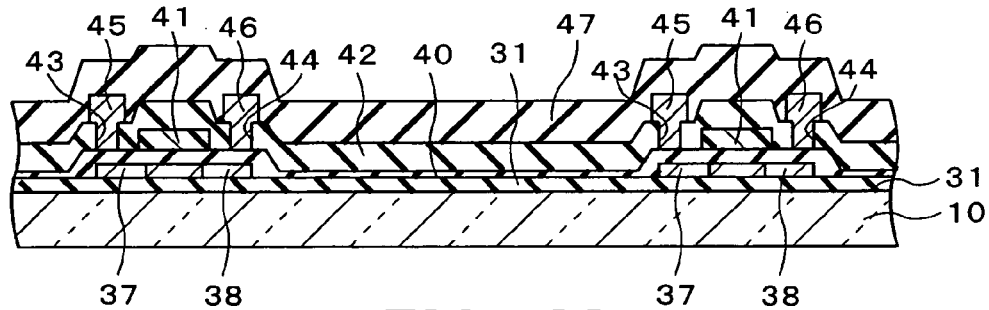
Figure 6C:
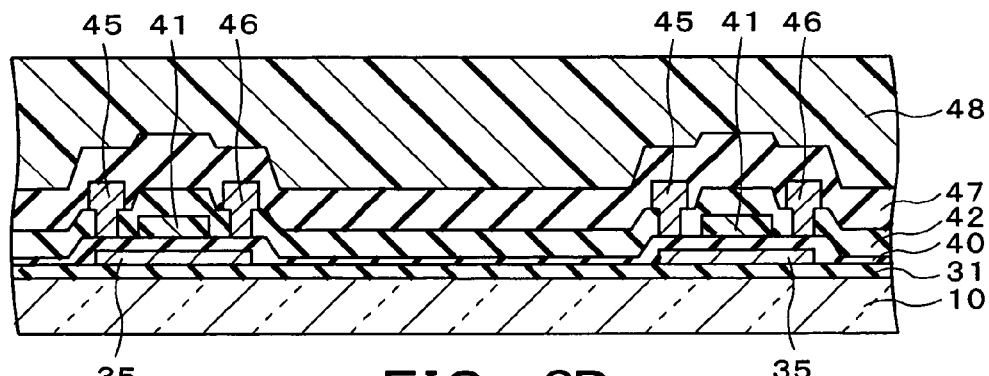

Next, as is shown in FIG. 6B, an inter-layer insulating film 47 composed of silicon oxide or silicon nitride is formed so as to cover the inter-layer insulating film 42, the source electrodes 45, and the drain electrodes 46. A flattening film 48 composed of a resin material such as an acrylic resin, polyimide resin, or the like is then formed, for example, on the inter-layer insulating film 47 over the entire surface of the substrate, as is shown in FIG. 6C. In this case, the flattening film 48 eliminates the indentations and projections caused by the semiconductor layer 35 and respective electrodes formed on the underlayer, so that a thickness that results in a flat substrate surface is obtained.

Figure 6D:
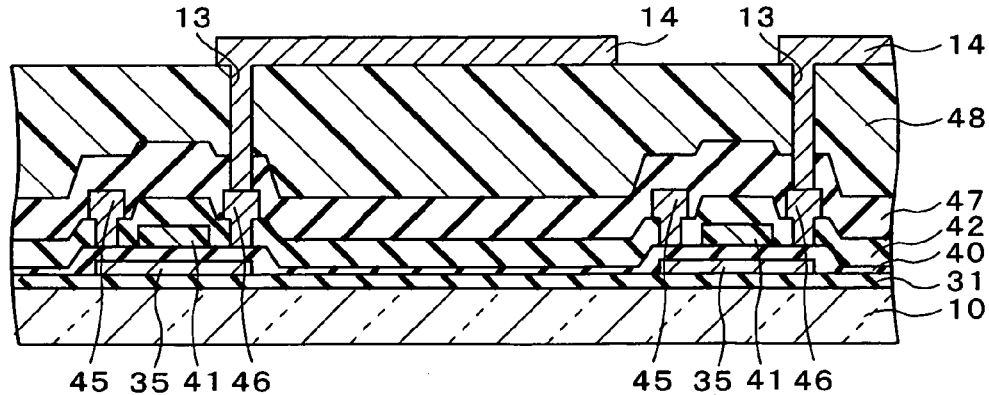

Next, as is shown in FIG. 6D, contact holes 13 that pass through the flattening film 48 and inter-layer insulating film 47 are formed in the regions directly above the drain electrodes 46 so that the surfaces of the drain electrodes 46 are exposed. Then, a transparent conductive film composed of a transparent conductive material such as ITO or the like is formed by a sputtering method or the like on, for example, the insides of the contact holes 13 and the surface of the flattening film 48. This transparent conductive film is then patterned to form pixel electrodes 14 that are electrically connected to the drain electrodes 24.

Figure 7:
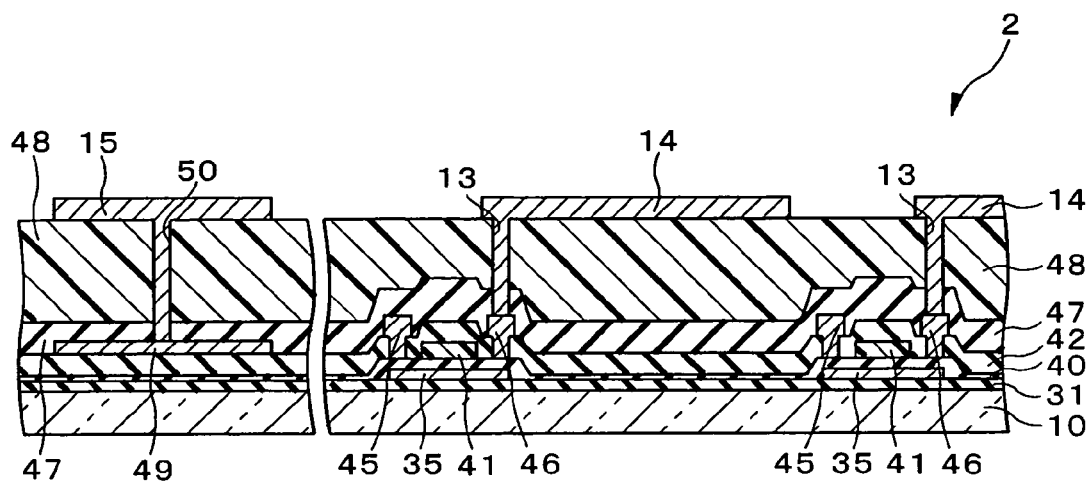
FIG. 7 is a sectional view showing the electrically conducting parts in the TFT substrate 2 manufactured by the method shown in FIGS. 5 and 6.

FIG. 7 is a sectional view showing the electrically conducting parts in the TFT substrate 2 manufactured by the method shown in FIGS. 5 and 6. In regard to the electrically conducting parts of the TFT substrate 2, as is shown in FIG. 7, an electrode layer 49 composed of a metal material such as aluminum or the like is formed on the inter-layer insulating film 42 by the same method as that used for the formation of the source electrodes 45 and drain electrodes 46, and contact holes 50 and a transfer electrode 15 composed of a transparent conductive material such as ITO or the like are formed on the flattening film 48 by the same method used to form the pixel electrodes 14. As a result, a transfer electrode 15 electrically connected to the electrode layer 49 via a plurality of contact holes 50 is formed.

Furthermore, a gate line drive circuit 23 and a data line drive circuit 17 are formed on the peripheral parts of the pixel array 30 on the transparent substrate 10, i.e., on the parts outside the display region. Moreover, the gate line drive circuit 23 and the respective gate electrodes 41 are electrically connected by the gate lines 19, and the data line drive circuit 17 and respective source electrodes 45 are electrically connected by the data lines 18. Furthermore, a flattening film 48 is also formed on the regions above these drive circuits and sets of wiring, so that a state in which there are no indentations or projections in the surface is obtained.

Figure 8A:
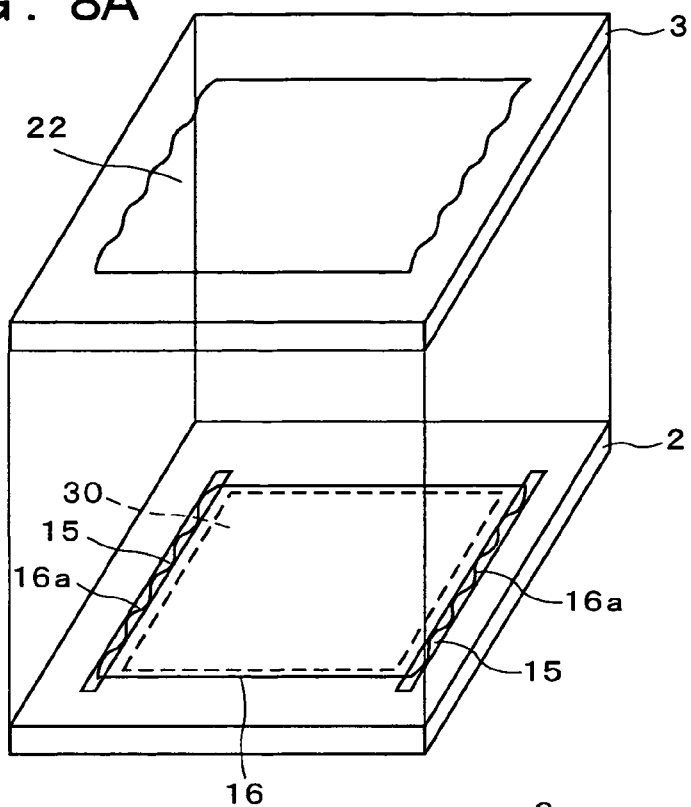
FIGS. 8A and 8B are perspective views showing the overlapping process in the method for manufacturing the liquid crystal display device 1 of the present embodiment in the order of the steps involved.
Figure 8B:
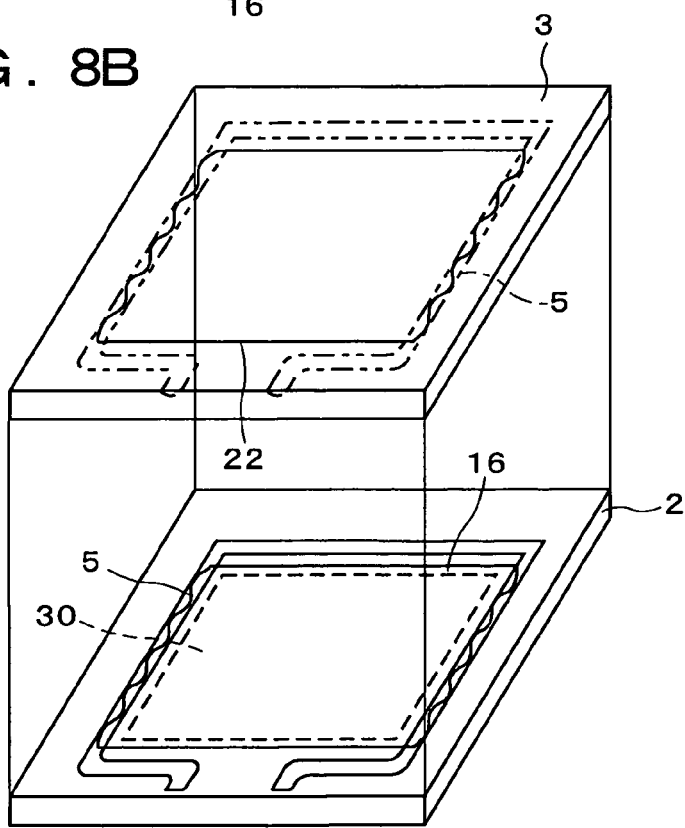

FIGS. 8A and 8B are perspective views showing the overlapping process in the method for manufacturing the liquid crystal display device 1 of the present embodiment in the order of the steps involved. As is shown in FIG. 8A, an alignment film 16 composed of a polyimide resin or the like is formed on the surface of the TFT substrate 2 shown in FIG. 7 by a flexo printing method so that the pixel array 30 is completely covered, and so that the end part [of this alignment film 16] is positioned on the transfer electrode 15. Used in the process is a printing plate which has a cut-out part 16a formed in the end part located on the side of the transfer electrode 15. Subsequently, a rubbing treatment is performed on the surface of the alignment film 16 in the direction in which the liquid crystal molecules are aligned, and spacers used to achieve a uniform gap are distributed on the surface of the alignment film 16. Furthermore, in cases where columnar spacers composed of a resin are formed on the counter substrate 3, this placement of spacers can be omitted. Next, as is shown in FIG. 8B, the peripheral edge parts of the alignment film 16 are coated with a resin material that includes conductive particles by screen printing, dispenser use, or the like, thus forming a sealing member 5 that surrounds the pixel array 30. At this time, a liquid crystal injection port 5a is formed in a portion of the sealing member 5.

Next, the method used to manufacture the counter substrate 3 will be described. In the counter substrate 3, as is shown in FIG. 8A, a counter electrode is formed on a transparent substrate 20 composed of glass or the like, and an alignment film 22 is formed by the same method as that used for the alignment film 16 in a region matching the region in which the alignment film 16 is formed on the TFT substrate 2.

Then, the TFT substrate 2 and the counter substrate 3 formed as described above are superimposed, a liquid crystal material is injected via the liquid crystal injection port 5a, and the liquid crystal injection port 5a is sealed by means of a hole sealing material to produce a liquid crystal display device 1.

In the liquid crystal display device 1 of the present embodiment, since a cut-out part 16a is formed in the end part of the alignment film 16 located on the side of the transfer electrode 15, stable electrical conductivity is obtained between the transfer electrode 15 and the counter electrode 21. Furthermore, since restrictions on the printing precision are substantially eliminated, a liquid crystal display device with a large display region and a small frame can be obtained. Moreover, since the amplitude of the cut-out part 16a is smaller than the width of the sealing member 5, no thick film region formed in the end part of the alignment film 16 is present on the inside of the of the sealing member 5, i.e., inside the cell. As a result, the cell gap and the film thickness of the alignment film 16 inside the cell can be made uniform, so that the transmissivity of the liquid crystal layer 4 with respect to the voltage can be made uniform over the entire area of the display region, and the display quality can therefore be improved.

Furthermore, since plastic particles covered with a metal film can be used as conductive particles, an organic flattening film can be formed as the underlayer of the transfer electrode. Moreover, since a cut-out part 16a is formed in the alignment film 16, even if a transfer electrode is formed on the organic flattening film, a sufficient bonding strength with the sealing member 5 can be obtained. As a result, the steps originating in the TFTs can be reduced, and a narrow cell gap can easily be obtained. Consequently, the response speed can be increased, the reliability can be high, and a liquid crystal display device with superior moving image quality can be manufactured at a low cost. Moreover, since the generation of dust during the rubbing treatment can be suppressed, the display quality can be improved. Furthermore, since a cut-out part 16a can be formed in the alignment film 16 without increasing the number of processes required, there is no increase in the manufacturing cost, and the productivity is superior.

Figure 9:
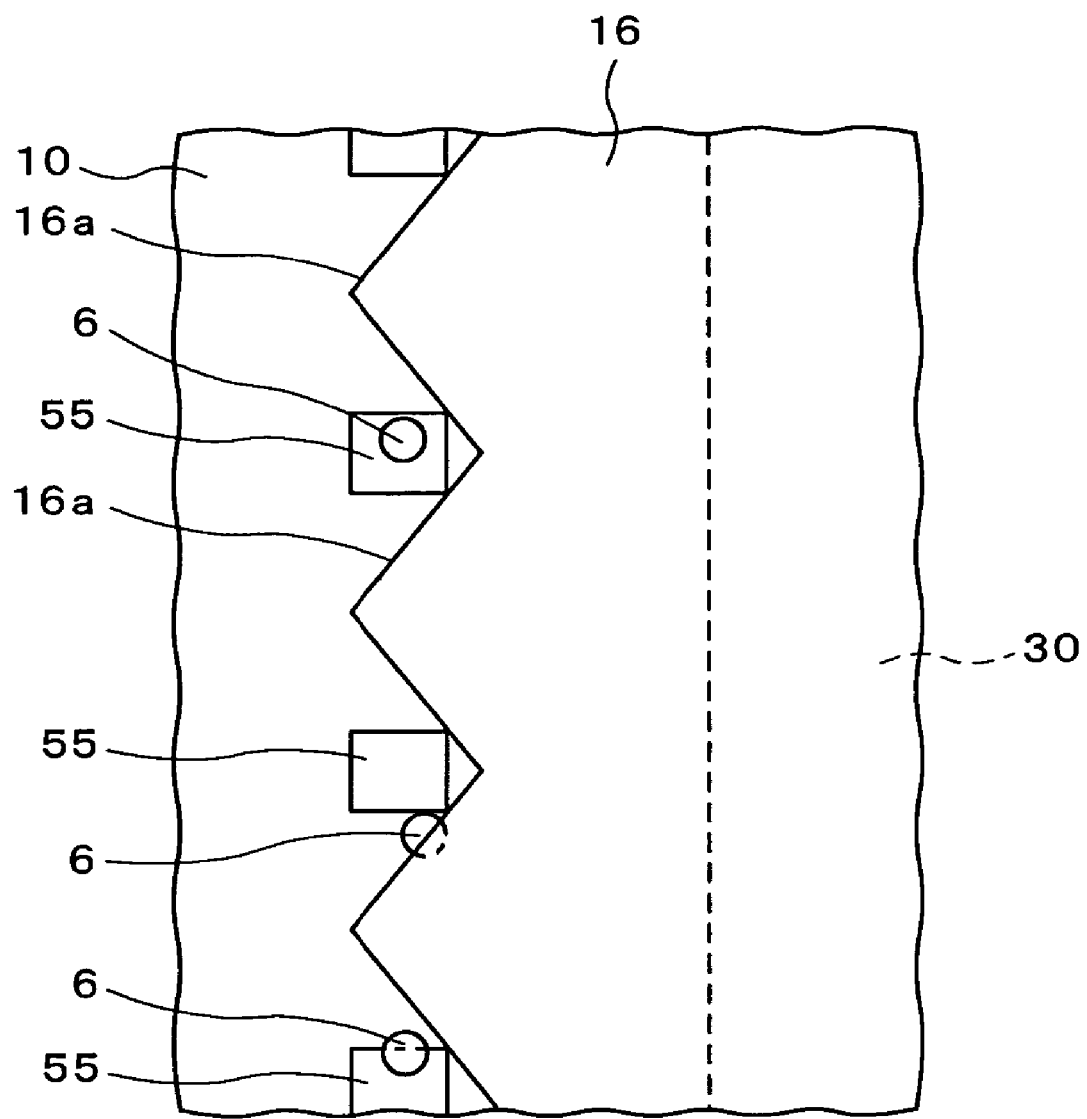
FIG. 9 is an enlarged plan view showing the TFT substrate of the liquid crystal display device of the second embodiment of the present invention.

Next, a liquid crystal display device constituting a second embodiment of the present invention will be described. FIG. 9 is an enlarged plan view showing the TFT substrate of the liquid crystal display device of the present embodiment. Furthermore, in FIG. 9, constituent elements that are the same as those of the TFT substrate 2 shown in FIG. 2 are labeled with the same reference numerals, and a detailed description of such constituent members is omitted. Furthermore, in FIG. 9, in order to facilitate viewing of the figure, only the conductive particles 6, transparent substrate 10, transfer electrode 55, alignment film 16, and pixel array 30 are shown. In the liquid crystal display device of the present embodiment, as is shown in FIG. 9, a plurality of transfer electrodes 55 are formed locally, and the alignment film 16 is formed so as to avoid the transfer electrodes 55. Specifically, the transfer electrodes 55 are formed in the area of the cut-out part 16a of the alignment film 16. In this liquid crystal display device 51, a contact hole is formed for each transfer electrode 55, and the transfer electrode 55 is connected to the electrode layer via this contact hole.

In the liquid crystal display device 51 of the present embodiment, the bonding area between the sealing member and the transfer electrode 55 can be made smaller than in the liquid crystal display device 1 of the abovementioned first embodiment; accordingly, the sealing width can be narrowed without lowering the bonding strength of the sealing member. Furthermore, in the liquid crystal display device 51 of the present embodiment, the circuit resistance between the transfer electrode 55 and counter electrode is large, and cases may occur in which an increase in the resistance value is not permissible. In such cases, however, the circuit resistance can be lowered by increasing the concentration of the conductive particles added to the sealing member. Furthermore, constructions and effects other than those described above in the liquid crystal display device 51 of the present embodiment are the same as in the liquid crystal display device 1 of the abovementioned first embodiment.

Next, a modification of the liquid crystal display device of the present invention will be described. FIGS. 10A and 10B are enlarged plan views showing the TFT substrate of a liquid crystal display device constituting a modification of the present embodiment. Furthermore, in FIG. 10, constituent elements that are the same as those of the TFT substrate shown in FIG. 2 are labeled with the same reference numerals, and a detailed description of such constituent elements is omitted. Moreover, in FIG. 10, in order to facilitate the viewing of the figure, only the conductive particles 6, transparent substrate 10, transfer electrode 55, alignment film and pixel array 30 are shown. In the liquid crystal display device 51 of the abovementioned second embodiment, the shape of the cut-out part was a triangular shape. However, the present invention is not limited to this option alone, and it is also possible to form cut-out parts of diverse shapes, such as the rectangular cut-out part 26a of the alignment film 26 shown in FIG. 10A, the semi-circular cut-out part 36a of the alignment film 36 shown in FIG. 10B, or the like. In these cases as well, the transfer electrode 55 is formed in areas where no alignment film is formed, i.e., in the area of the cut-out part.

Figure 11A:
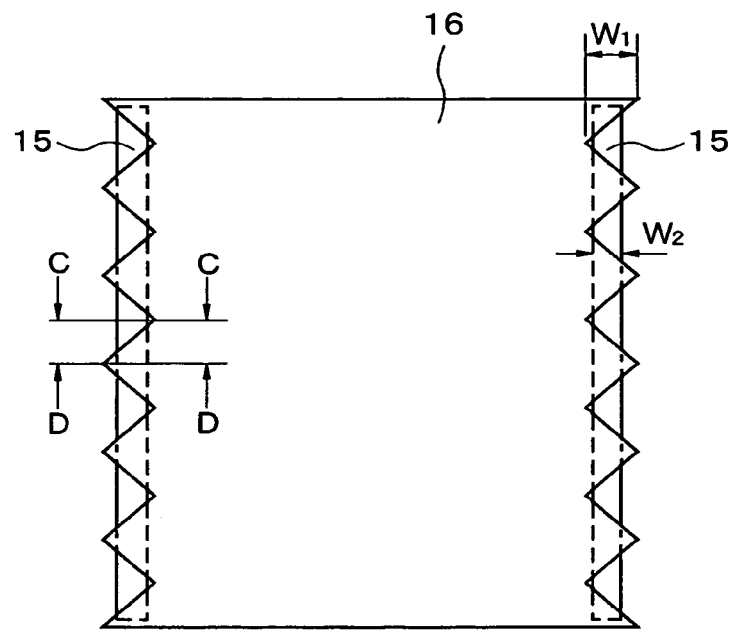
FIG. 11A is a plan view showing the alignment film and the transfer electrode of the liquid crystal display device of Example 1 of the present invention and FIGS. 11B and 11C are sectional views showing the TFT substrate of the liquid crystal display device of Example 1 of the present invention, where FIG. 11B corresponds to a sectional view along line C-C in FIG. 11A, and FIG. 11C corresponds to a sectional view along line D-D in FIG. 11A.
Figure 11B:
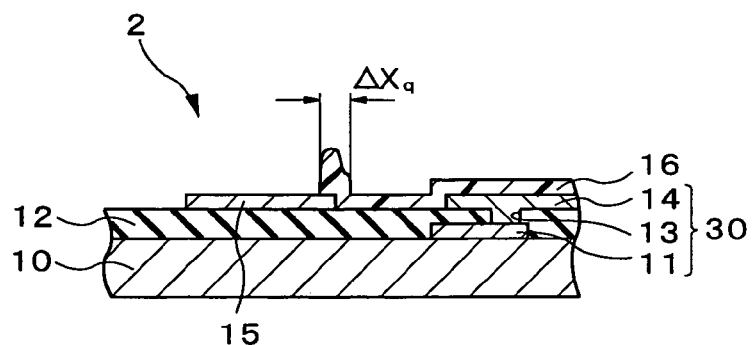
Figure 11C:
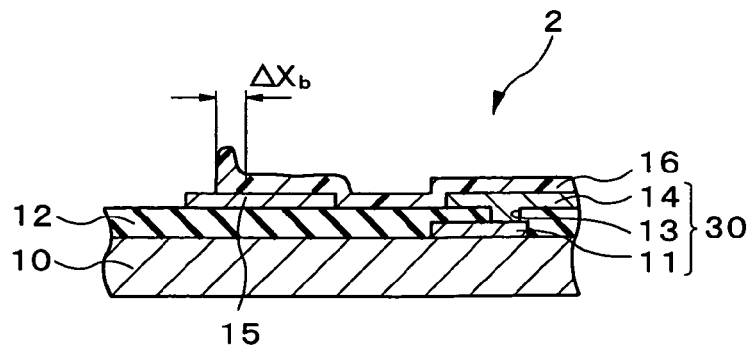

Next, the effects of examples of the present invention will be described in comparison with examples (comparative examples) that depart from the scope of the present invention. Furthermore, the present invention is not limited to the following examples but can be worked with appropriate modifications. FIG. 11A is a plan view showing the alignment film and the transfer electrode of the liquid crystal display device of Example 1 of the present invention, and FIGS. 11B and 11C are sectional views showing the TFT substrate of the liquid crystal display device of Example 1 of the present invention, with FIG. 11B corresponding to a sectional view along line C-C in FIG. 11A, and FIG. 11C corresponding to a sectional view along line D-D in FIG. 11A. First, an alignment film 16 composed of a polyimide film with a thickness of 40 nm in which a triangular cut-out part 16a was formed in the end part located on the side of the transfer electrode 15 was formed by flexo printing on a TFT substrate 2 and on a counter substrate (not shown in the figures) on which an organic flattening film with a thickness of 1.5 μm was disposed on the uppermost layer of an insulating layer 12, so that the end edge provided with the cut-out part 16a was disposed on the transfer electrode 15 to obtain the liquid crystal display device of Example 1 of the present invention, as shown in FIGS. 11A through 11C. In this case, the width $W_2$ of the transfer electrode 15 was set at 90% of the width of the cut-out part 16a, and the area of the portion of the transfer electrode 15 on which no alignment film 16 was formed was set at 50% of the area of the transfer electrode. Furthermore, the sealing width was set at 1.5 times the width $W_1$ of the cut-out part 16a.

In the thick film region formed in the alignment film 16 on the TFT substrate 2 of the liquid crystal display device of the present example, the width $\Delta X_a$ of the thick film region close to the pixel array 30 was 0.47, and the width $\Delta X_b$ of the thick film region distant from the pixel array 30 was 1.39. Next, a sealing member 5 including 0.1 mass % plastic conductive particles was formed on the peripheral edges of the alignment film 16 of the TFT substrate 2 so as to cover the transfer electrode 15, and the TFT substrate 2 and the counter substrate were then bonded by applying a pressure of 45 kPa. In this case, the amount of impregnation of the organic flattening film was 0.1 μm.

Figure 12:
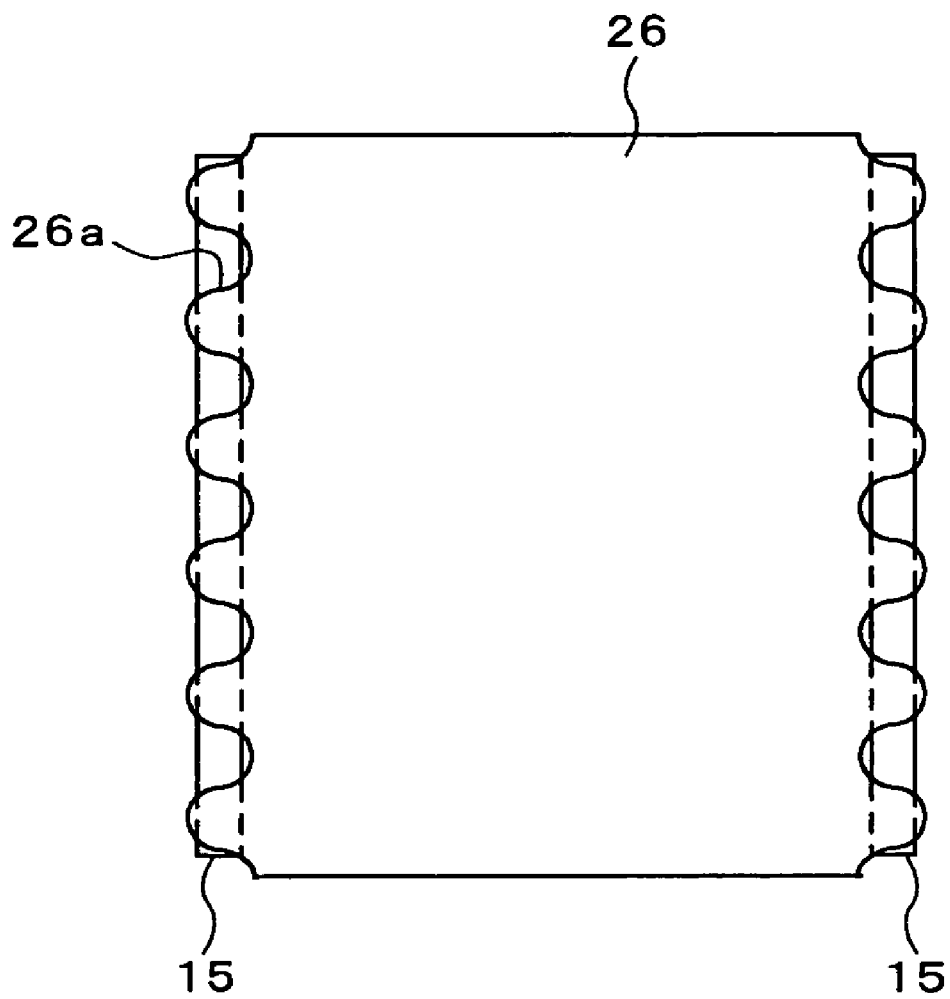
FIG. 12 is a plan view showing the alignment film and the transfer electrode of the liquid crystal display device of Example 2 of the present invention.

FIG. 12 is a plan view showing the alignment film and the transfer electrode of the liquid crystal display device of Example 2 of the present invention. Next, a liquid crystal display device was manufactured as the liquid crystal display device of Example 2 of the present invention, by the same method and under the same conditions as in the case of the liquid crystal display device of the abovementioned Example 1, except for the fact that a semi-circular cut-out part 26a was formed in the end part of the alignment film 26, as shown in FIG. 12. In the liquid crystal display device of this Example 2, the width $\Delta X_a$ of the thick film region close to the pixel array 30 was 0.58, and the width $\Delta X_b$ of the thick film region distant from the pixel array 30 was 1.03.

Figure 13:
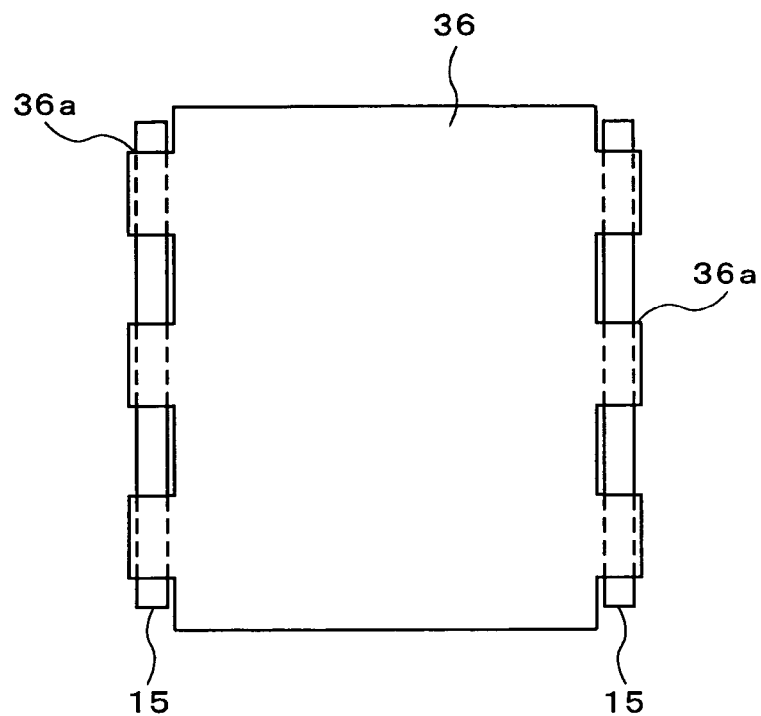
FIG. 13 is a plan view showing the alignment film and the transfer electrode of the liquid crystal display device of Example 3 of the present invention.

FIG. 13 is a plan view showing the alignment film and the transfer electrode of the liquid crystal display device of Example 3 of the present invention. Next, a liquid crystal display device was manufactured as the liquid crystal display device of Example 3 of the present invention by the same method and under the same conditions as in the case of the liquid crystal display device of the abovementioned Example 1, except for the fact that a rectangular cut-out part 36a was formed in the end part of the alignment film 36, as shown in FIG. 13. In the liquid crystal display device of this Example 3, the width $\Delta X_a$ of the thick film region close to the pixel array 30 was 0.71, and the width $\Delta X_b$ of the thick film region distant from the pixel array 30 was 1.42.

Next, a liquid crystal display device was manufactured as the liquid crystal display device of Example 4 of the present invention by the same method and under the same conditions as in the case of the liquid crystal display device of the abovementioned Example 1, except for the fact that the width $W_2$ of the transfer electrode was set at 110% of the amplitude $W_1$ of the cut-out part. In the liquid crystal display device of this Example 4, the width $\Delta X_a$ of the thick film region close to the pixel array was 0.47, and the width $\Delta X_b$ of the thick film region distant from the pixel array was 1.39.

Figure 14:
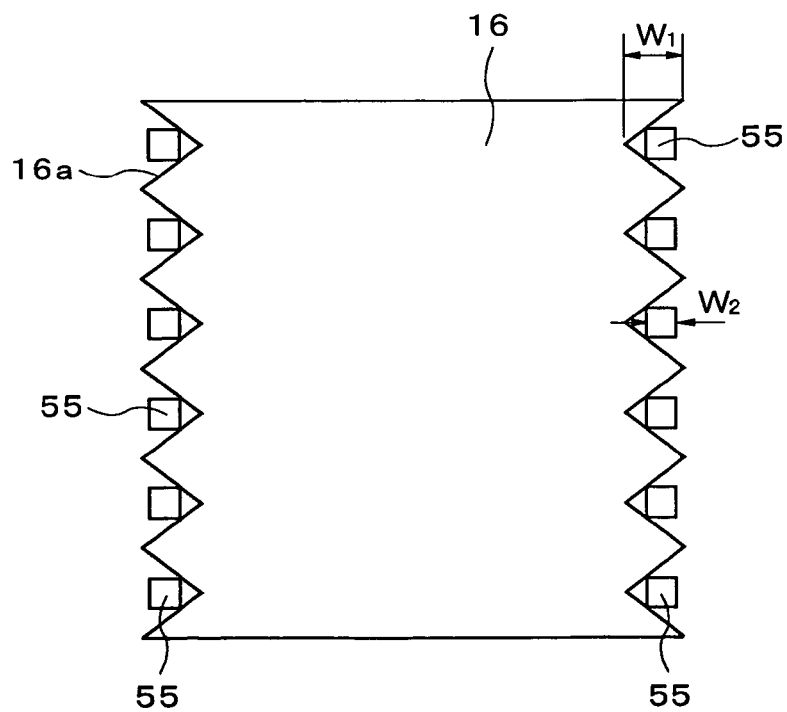
FIG. 14 is a plan view showing the alignment film and the transfer electrode of the liquid crystal display device of Example 5 of the present invention.

FIG. 14 is a plan view showing the alignment film and the transfer electrode of the liquid crystal display device of Example 5 of the present invention. Next, a liquid crystal display device was manufactured as the liquid crystal display device of Example 5 of the present invention by the same method and under the same conditions as in the case of the liquid crystal display device of the abovementioned Example 1, except for the fact that a plurality of transfer electrodes 55 were formed locally, as shown in FIG. 14. In the liquid crystal display device of this Example 5, the width $\Delta X_a$ of the thick film region close to the pixel array 30 was 0.47, and the width $\Delta X_b$ of the thick film region distant from the pixel array 30 was 1.39.

Next, a liquid crystal display device was manufactured as the liquid crystal display device of Example 6 of the present invention by the same method and under the same conditions as in the case of the liquid crystal display device of the abovementioned Example 5, except for the fact that a semi-circular cut-out part was formed in the end part of the alignment film. In the liquid crystal display device of this Example 6, the width $\Delta X_a$ of the thick film region close to the pixel array was 0.58, and the width $\Delta X_b$ of the thick film region distant from the pixel array was 1.03.

Next, a liquid crystal display device was manufactured as the liquid crystal display device of Example 7 of the present invention by the same method and under the same conditions as in the case of the liquid crystal display device of the abovementioned Example 5, except for the fact that a rectangular cut-out part was formed in the end part of the alignment film. In the liquid crystal display device of this Example 7, the width $\Delta X_a$ of the thick film region close to the pixel array was 0.71, and the width $\Delta X_b$ of the thick film region distant from the pixel array was 1.42

Next, a liquid crystal display device was manufactured as the liquid crystal display device of Example 8 of the present invention by the same method and under the same conditions as in the case of the liquid crystal display device of the abovementioned Example 1, except for the fact that the width $W_2$ of the transfer electrode was set at 110% of the amplitude $W_1$ of the cut-out part. In the liquid crystal display device of this Example 8, the width $\Delta X_a$ of the thick film region close to the pixel array was 0.47, and the width $\Delta X_b$ of the thick film region distant from the pixel array was 1.39.

Figure 15:
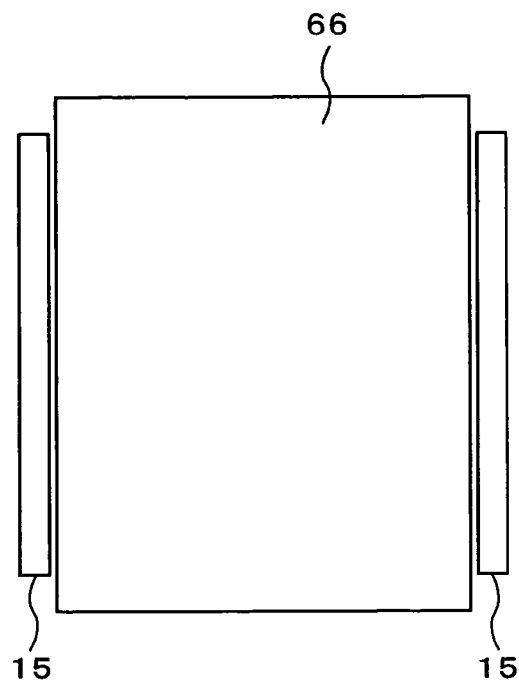
FIG. 15 is a plan view showing the alignment film and the transfer electrode of the liquid crystal display device of Comparative Example 1 of the present invention.

FIG. 15 is a plan view showing the alignment film and the transfer electrode of the liquid crystal display device of Comparative Example 1 of the present invention. Furthermore, a liquid crystal display device was manufactured as Comparative Example 1 of the present invention by the same method and under the same conditions as in the case of the liquid crystal display device of Example 1 above, except for the fact that no cut-out part was formed in the end part of the alignment film 66, and the alignment film 66 was formed further to the inside than the transfer electrode 15, as shown in FIG. 15. In the liquid crystal display device of this Comparative Example 1, the width $\Delta X_a$ of the thick film region close to the pixel array was 1.00.

Figure 16:
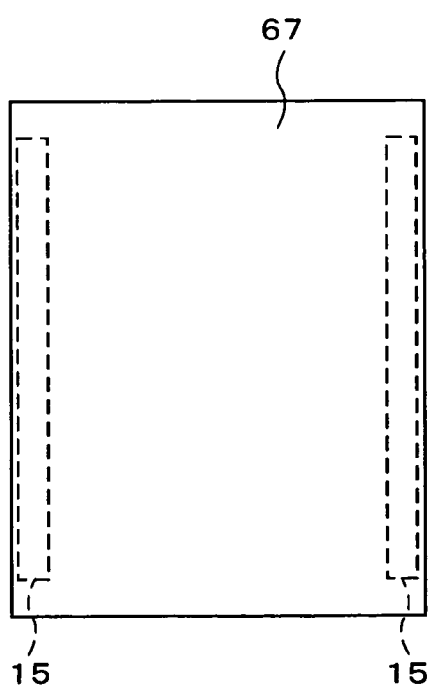
FIG. 16 is a plan view showing the alignment film and the transfer electrode of the liquid crystal display device of Comparative Example 2 of the present invention.

FIG. 16 is a plan view showing the alignment film and the transfer electrode of the liquid crystal display device of Comparative Example 2 of the present invention. Next, a liquid crystal display device was manufactured as Comparative Example 2 of the present invention by the same method and under the same conditions as in the case of the liquid crystal display device of Example 1 above, except for the fact that no cut-out part was formed in the end part of the alignment film 67, and the alignment film 67 covered the entire surface of the transfer electrode 15, as shown in FIG. 16. In the liquid crystal display device of this Comparative Example 2, the width $\Delta X_a$ of the thick film region close to the pixel array was 1.00.

Figure 17:
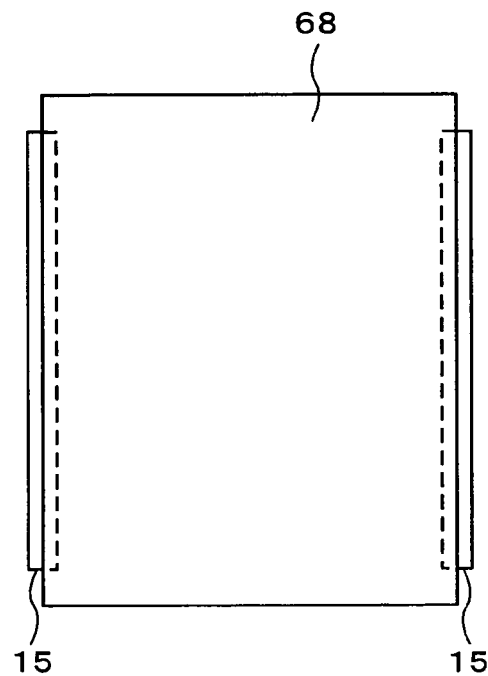
FIG. 17 is a plan view showing the alignment film and the transfer electrode of the liquid crystal display device of Comparative Example 3 of the present invention.

FIG. 17 is a plan view showing the alignment film and the transfer electrode of the liquid crystal display device of Comparative Example 3 of the present invention. Next, a liquid crystal display device was manufactured as Comparative Example 3 of the present invention by the same method and under the same conditions as in the case of the liquid crystal display device of Example 1 above, except for the fact that no cut-out part was formed in the end part of the alignment film 68, as shown in FIG. 17. In the liquid crystal display device of this Comparative Example 3, the width $\Delta X_a$ of the thick film region close to the pixel array was 1.00.

Figure 18:
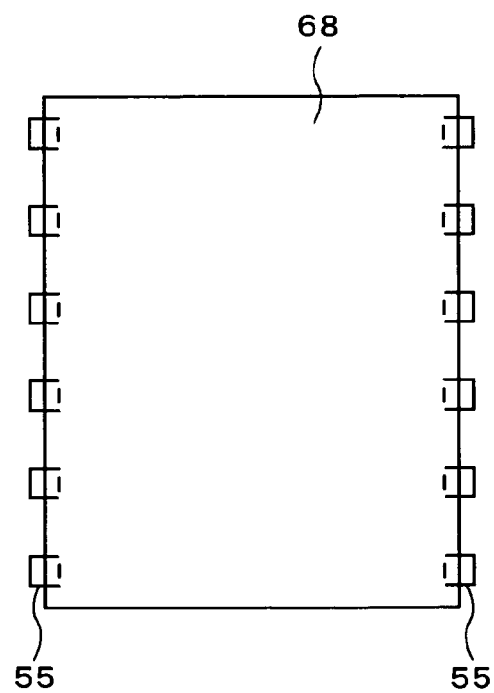
FIG. 18 is a plan view showing the alignment film and the transfer electrode of the liquid crystal display device of Comparative Example 4 of the present invention.
Figure 19:
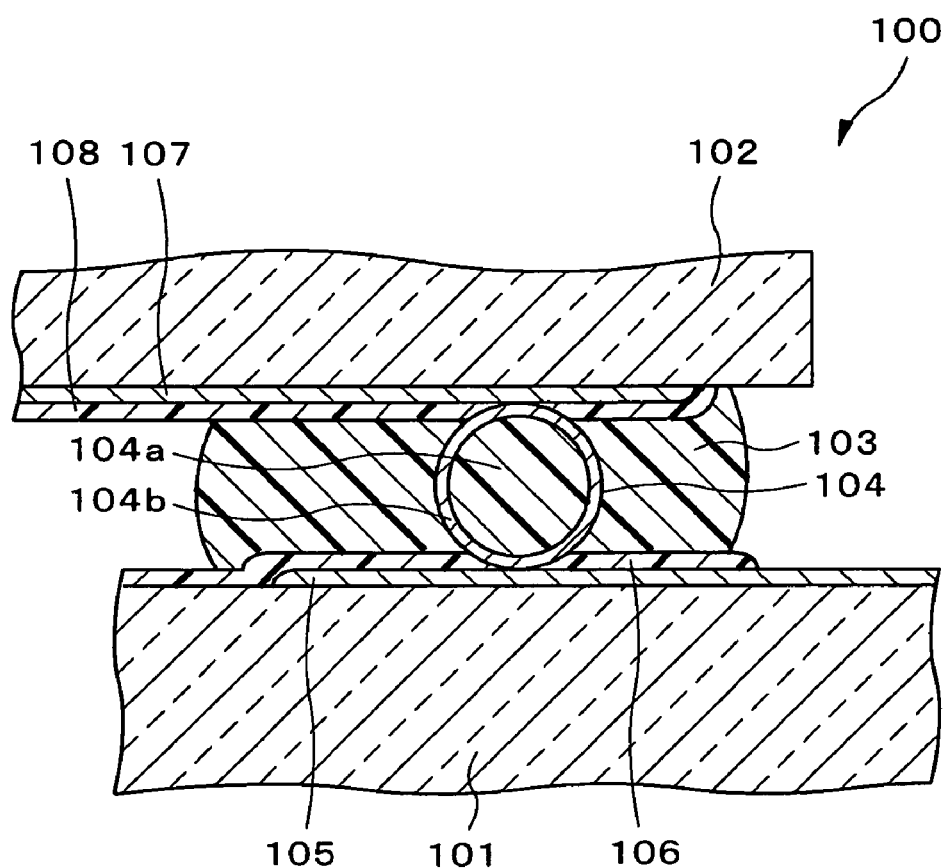
FIG. 19 is a sectional view showing the electrically conducting parts of the liquid crystal display device of Japanese Laid-Open Patent Application No. 2001-183690.
Figure 20:
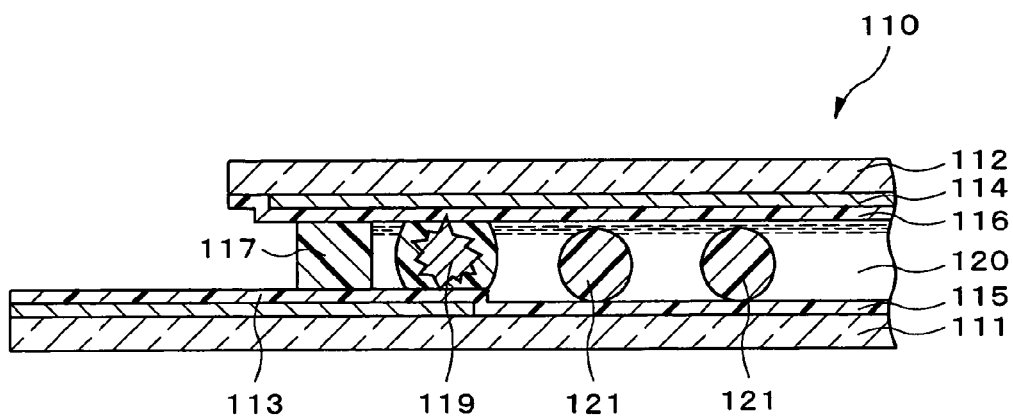
FIG. 20 is a sectional view showing the electrically conducting parts of the liquid crystal display device of Japanese Laid-Open Patent Application No. 11-2820.
Figure 21:
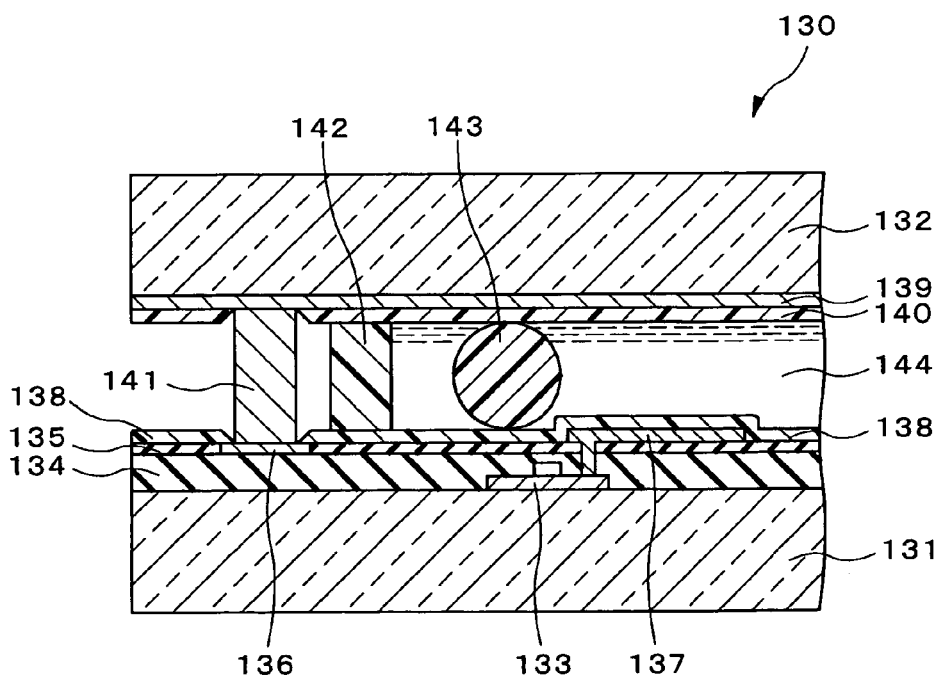
FIG. 21 is a sectional view showing the electrically conducting parts of the liquid crystal display device of Japanese Laid-Open Patent Application No. 2000-47241.
Figure 22A:
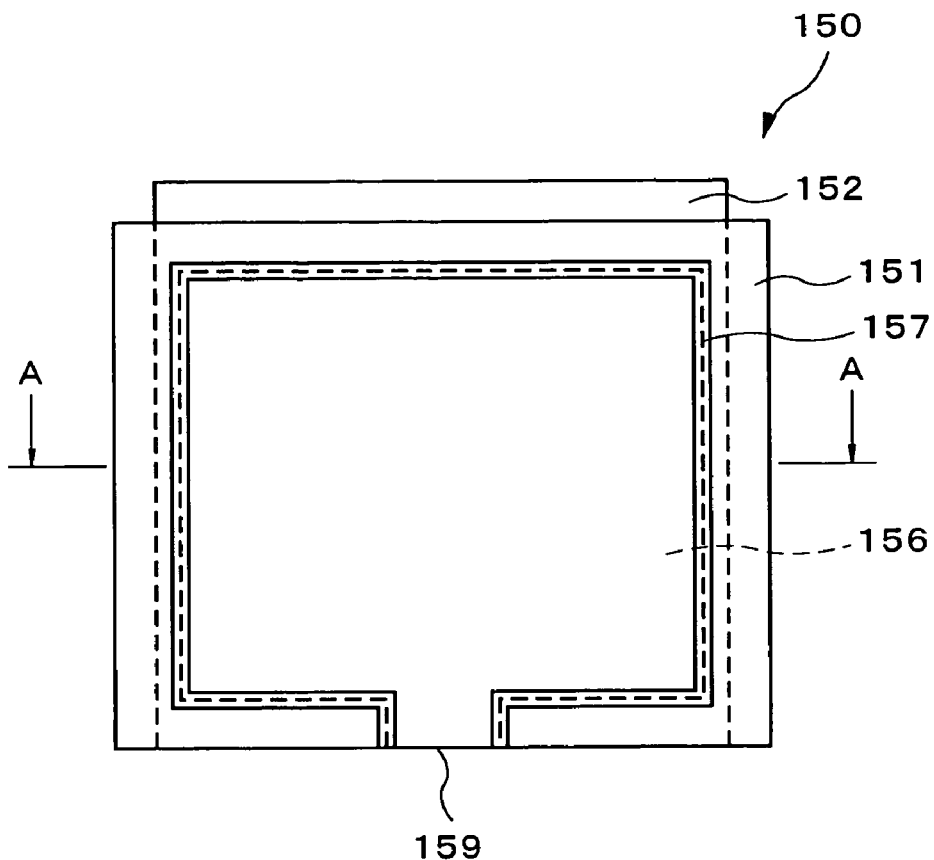
FIG. 22A is a plan view showing the display panel of the liquid crystal display device of Japanese Laid-Open Patent Application No. 2000-47228.
Figure 22B:
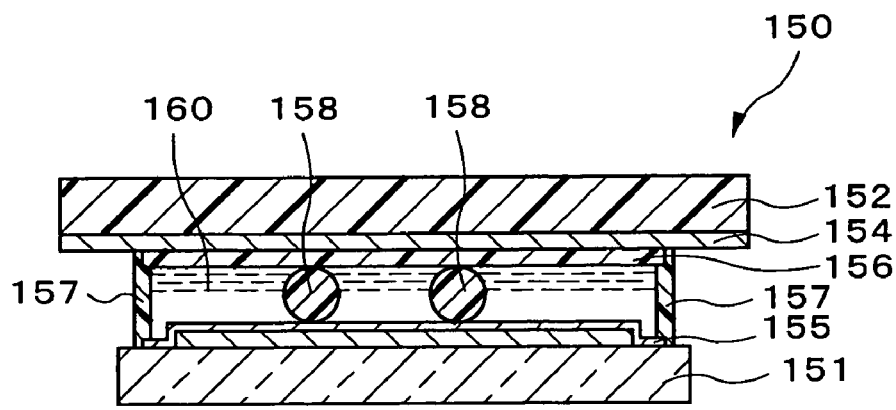
FIG. 22B is a sectional view along line A-A in FIG. 22A.
Figure 23A:
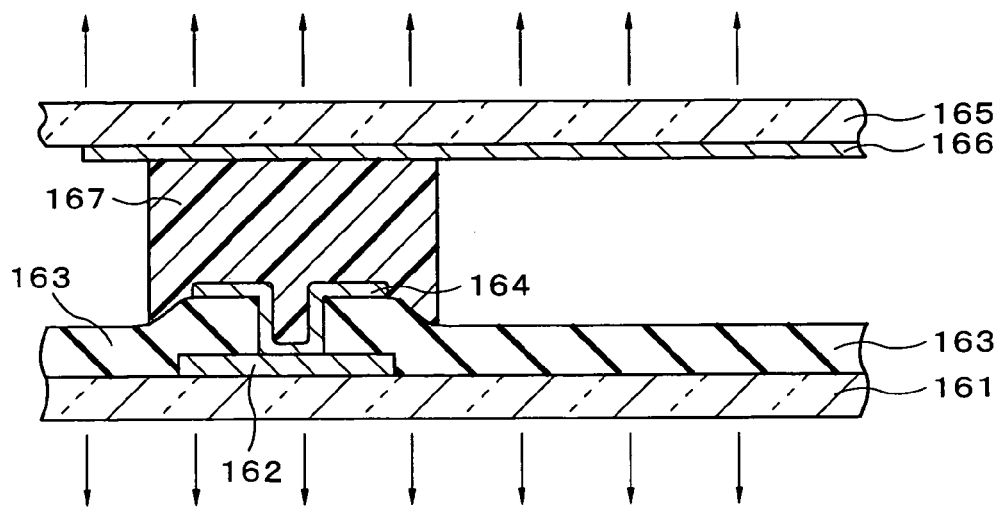
FIGS. 23A and 23B are sectional views showing the method for testing the adhesive strength of the sealing member in the order of the processes involved.
Figure 23B:
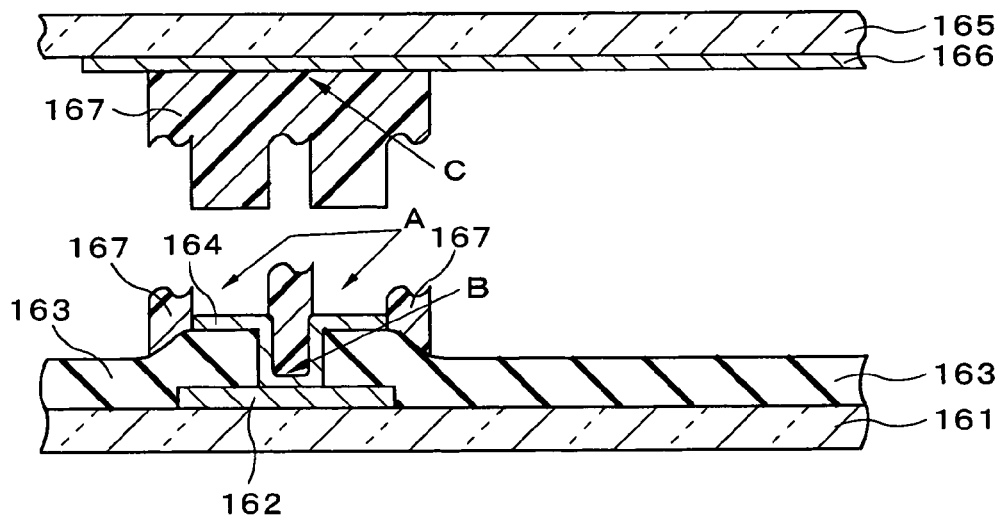

FIG. 18 is a plan view showing the alignment film and the transfer electrode of the liquid crystal display device of Comparative Example 4 of the present invention. Next, a liquid crystal display device was manufactured as Comparative Example 4 of the present invention by the same method and under the same conditions as in the case of the liquid crystal display device of Example 1 above, except for the fact that no cut-out part was formed in the end part of the alignment film 68, as shown in FIG. 18. In the liquid crystal display device of this Comparative Example 4, the width $\Delta X_a$ of the thick film region close to the pixel array was 1.00.

Ten units each of the liquid crystal display devices of the abovementioned Examples 1 through 8 and Comparative Examples 1 through 4 were manufactured, and the circuit resistance and seal peeling strength of the upper and lower substrates were measured. Furthermore, the measurement samples were evaluated as image displays, and an investigation was made as to whether or not flicker was generated. The results are summarized in the following Tables 3 and 4. The circuit resistance values and peeling strength values shown in the following Tables 3 and 4 are values that are standardized with the results for the liquid crystal display device of Comparative Example 1 taken as 1. Moreover, the results other than the circuit resistance values are all mean values for 10 samples.

TABLE 3

| | Transfer electrode | | | |
|---|---|---|---|---|
| | Shape of cut-out part | Shape | Alignment film coverage (%) | $W_2/W_1$ (%) | $\Delta Xa$ (pixel side) |
| Example 1 | Triangular | Continuous | 50 | 90 | 0.47 |
| Example 2 | Semi-circular | Continuous | 50 | 90 | 0.58 |
| Example 3 | Rectangular | Continuous | 50 | 90 | 0.71 |
| Example 4 | Triangular | Continuous | 50 | 110 | 0.47 |
| Example 5 | Triangular | Discrete | 0 | 90 | 0.47 |
| Example 6 | Semi-circular | Discrete | 0 | 90 | 0.58 |
| Example 7 | Rectangular | Discrete | 0 | 90 | 0.71 |
| Example 8 | Triangular | Discrete | 0 | 110 | 0.47 |
| Comparative Example 1 | None | Continuous | 0 | — | 1.00 (reference value) |
| Comparative Example 2 | None | Continuous | 100 | — | 1.00 |
| Comparative Example 3 | None | Continuous | 50 | — | 1.00 |
| Comparative Example 4 | None | Discrete | 50 | — | 1.00 |

TABLE 4

| | $\Delta Xb$ (external side) | Circuit resistance | | Peeling strength | Flicker |
|---|---|---|---|---|---|
| | | Mean | Standard deviation | | |
| Example 1 | 1.39 | 3.1 | 0.9 | 1.20 | ○ |
| Example 2 | 1.03 | 3.3 | 0.9 | 1.22 | ○ |
| Example 3 | 1.42 | 3.1 | 1.0 | 1.18 | ○ |
| Example 4 | 1.39 | 2.9 | 0.9 | 1.15 | ○ |
| Example 5 | 1.39 | 5.8 | 0.9 | 1.37 | ○ |
| Example 6 | 1.03 | 6.0 | 1.0 | 1.38 | ○ |
| Example 7 | 1.42 | 5.7 | 0.9 | 1.36 | ○ |
| Example 8 | 1.39 | 5.2 | 0.9 | 1.30 | ○ |
| Comparative Example 1 | — | 1.0 (reference value) | 1.0 (reference) | 1.00 (reference) | ○ |
| Comparative Example 2 | — | Infinitely large | — | 1.27 | — |
| Comparative Example 3 | — | 3.0 | 5.0 | 1.12 | ○ |
| Comparative Example 4 | — | 12.3 | 4.7 | 1.36 | X |

As is shown in the above Tables 3 and 4, in the liquid crystal display devices of Examples 1 through 4 in which one transfer electrode 15 each was formed on either side of the pixel array 30, the circuit resistance between the substrates was approximately three times higher than in the liquid crystal display device of Comparative Example 1, regardless of the shape of the cut-out part. However, flicker was not observed, and the peeling strength of the sealing member was increased by approximately 20%. Furthermore, in the liquid crystal display devices of Examples 5 through 8, in which a plurality of transfer electrodes 55 were locally formed on both sides of the pixel array 30, the circuit resistance between the substrates was approximately six times higher than in the liquid crystal display device of Comparative Example 1, regardless of the shape of the cut-out part. No flicker was observed, and the peeling strength of the sealing member was increased by approximately 40%. Moreover, when the liquid crystal display device of Example 1 and the liquid crystal display device of Example 4, or the liquid crystal display device of Example 5 and the liquid crystal display device of Example 8, were compared, it was found that the bonding strength of the sealing parts was increased when the width of the transfer electrode was smaller than the amplitude of the cut-out part in the alignment film. The width $\Delta X_a$ of the thick film region on the pixel array side of the alignment film was also found to show a minimum value of 0.47 in cases where the shape of the cut-out part was triangular.

On the other hand, in the liquid crystal display devices of Comparative Examples 2 and 4, the circuit resistance between the substrates was large, and flicker occurred in the case of the liquid crystal display device of Comparative Example 4. Furthermore, although the liquid crystal display device of Comparative Example 3 showed no flicker, a large variation was seen in the circuit resistance between the substrates. In the case of this liquid crystal display device, it may be predicted that this variation will become even larger and there is a possibility that the problem of flicker will become more pronounced in cases where an attempt is made to narrow the frame, unless there is an improvement in the positional precision of the printing of the alignment film.

What is claimed is:

1. A liquid crystal display device having a liquid crystal layer sealed between a first substrate on which pixel circuits are formed and a second substrate on which a counter electrode is formed, and said first and second substrates being connected to each other via a sealing member, said liquid crystal display further comprising:
   said first substrate having a wiring layer which is connected to said pixel circuits, a conducting electrode which is mounted on the surface facing said liquid crystal layer and which is connected to said wiring layer, and a first alignment film which is mounted on the surface facing said liquid crystal layer and which is used to align the liquid crystal molecules of said liquid crystal layer;
   a cut-out part being formed in said first alignment film in at least one portion of the part which is mounted on top of said conducting electrode;
   said sealing member being formed so as to cover the conducting electrode; and
   said conducting electrode and the sealing member make contact in said cut-out part of the first alignment film.

2. A liquid crystal display device having a liquid crystal layer sealed between a first substrate on which pixel circuits are formed and a second substrate on which a counter electrode is formed, and said first and second substrates being connected to each other via a sealing member composed of a resin material that includes conductive particles, said liquid display device further comprising:
   said first substrate having a wiring layer which is connected to said pixel circuits, an insulating layer which is formed on the surface facing said liquid crystal layer so as to cover the pixel circuits and wiring layer, a conducting electrode which is mounted on said insulating layer and which is connected to said wiring layer, and a first alignment film which is disposed on top of said insulating layer so as to cover the region directly above said pixel circuit and which aligns the liquid crystal molecules of the liquid crystal layer;
   a cut-out part being formed in the alignment film in the end part located on the side of said conducting electrode;
   said cut-out part being positioned on the conducting electrode;
   said sealing member being formed so as to cover the conducting electrode and be in contact with at least a part of said counter electrode;
   the conducting electrode and the counter electrode being in contact with each other in the cut-out part of the first alignment film; and
   the conducting electrode and the sealing member being connected to each other.

3. The liquid crystal display device according to claim 1, wherein the amplitude of said cut-out part is greater than the width of said conducting electrode.

4. The liquid crystal display device according to claim 2, wherein the amplitude of said cut-out part is greater than the width of said conducting electrode.

5. A liquid crystal display device having a liquid crystal layer sealed between a first substrate on which pixel circuits are formed and a second substrate on which a counter electrode is formed, and said first and second substrates being connected to each other via a sealing member, said liquid crystal display device comprising:
   said first substrate having a wiring layer connected to said pixel circuits, a plurality of electrodes used for electrical conductivity which are locally disposed on the surface facing said liquid crystal layer and which are respectively connected to said wiring layer, and a first alignment film which is disposed on the surface facing said liquid crystal layer and which aligns the liquid crystal molecules of the liquid crystal layer; and
   the portion of the end part of the first alignment film facing the conducting electrode that is located directly above the conducting electrode forms a cut-out part, and said sealing member is formed on the end part of the alignment film facing the conducting electrode so as to cover said conducting electrode.

6. A liquid crystal display device having a liquid crystal layer sealed between a first substrate on which pixel circuits are formed and a second substrate on which a counter electrode is formed, and said first and second substrates being connected to each other via a sealing member composed of a resin material that includes conductive particles, said liquid crystal display device further comprising:
   said first substrate having a wiring layer which is connected to said pixel circuits, an insulating layer which is formed on the surface facing said liquid crystal layer so as to cover said pixel circuits and wiring layer, a plurality of electrodes used for electrical conductivity which are locally disposed on said insulating layer and which are respectively connected to said wiring layer, and a first alignment film which is disposed on said insulating layer so as to cover the region immediately above said pixel circuits and which aligns the liquid crystal molecules of said liquid crystal layer:
   that portion of the end part of said first alignment film on the side of the conducting electrode which is immediately above the conducting electrode forming a cut-out part;
   said sealing member being in contact with at least a portion of said counter electrode and being formed on the end part of said alignment film on the side of the conducting electrode so as to cover the conducting electrode; and said conducting electrode and counter electrode being connected to each other via the sealing member.

7. The liquid crystal display device according to claim 2, wherein said insulating layer has an inter-layer insulating film and a flattening film that is formed on said inter-layer insulating film, and said flattening film is formed by a resin material.

8. The liquid crystal display device according to claim 6, wherein said insulating layer has an inter-layer insulating film and a flattening film that is formed on said inter-layer insulating film, and said flattening film is formed by a resin material.

9. The liquid crystal display device according to claim 7, wherein said sealing member is in contact with said conducting electrode, said flattening film, and said first alignment film.

10. The liquid crystal display device according to claim 8, wherein said sealing member is in contact with said conducting electrode, said flattening film, and said first alignment film.

11. The liquid crystal display device according to claim 2, wherein said conductive particles are plastic particles whose surfaces are coated with a metal thin film.

12. The liquid crystal display device according to claim 6, wherein said conductive particles are plastic particles whose surfaces are coated with a metal thin film.

13. The liquid crystal display device according to claim 1, wherein a thin film transistor is mounted for each pixel in said pixel circuit.

14. The liquid crystal display device according to claim 2, wherein a thin film transistor is mounted for each pixel in said pixel circuit.

15. The liquid crystal display device according to claim 5, wherein a thin film transistor is mounted for each pixel in said pixel circuit.

16. The liquid crystal display device according to claim 6, wherein a thin film transistor is mounted for each pixel in said pixel circuit.

17. The liquid crystal display device according to claim 1, wherein the amplitude of said cut-out part is smaller than the width of said sealing member.

18. The liquid crystal display device according to claim 2, wherein the amplitude of said cut-out part is smaller than the width of said sealing member.

19. The liquid crystal display device according to claim 5, wherein the amplitude of said cut-out part is smaller than the width of said sealing member.

20. The liquid crystal display device according to claim 6, wherein the amplitude of said cut-out part is smaller than the width of said sealing member.

21. The liquid crystal display device according to claim 1, wherein said second substrate has a second alignment film that aligns the liquid crystal molecules of said liquid crystal layer in a position facing said first alignment film on the surface facing said liquid crystal layer, and a cut-out part is also formed in the end part of this second alignment film facing said conducting electrode.

22. The liquid crystal display device according to claim 2, wherein said second substrate has a second alignment film that aligns the liquid crystal molecules of said liquid crystal layer in a position facing said first alignment film on the surface facing said liquid crystal layer, and a cut-out part is also formed in the end part of this second alignment film facing said conducting electrode.

23. The liquid crystal display device according to claim 5, wherein said second substrate has a second alignment film that aligns the liquid crystal molecules of said liquid crystal layer in a position facing said first alignment film on the surface facing said liquid crystal layer, and a cut-out part is also formed in the end part of this second alignment film facing said conducting electrode.

24. The liquid crystal display device according to claim 6, wherein said second substrate has a second alignment film that aligns the liquid crystal molecules of said liquid crystal layer in a position facing said first alignment film on the surface facing said liquid crystal layer, and a cut-out part is also formed in the end part of this second alignment film facing said conducting electrode.

25. The liquid crystal display device according to claim 1, wherein said cut-out part has a triangular shape.

26. The liquid crystal display device according to claim 2, wherein said cut-out part has a triangular shape.

27. The liquid crystal display device according to claim 3, wherein said cut-out part has a triangular shape.

28. A method for manufacturing a liquid crystal display device having a liquid crystal layer sealed between a first substrate provided with a conducting electrode in mutual connection with a wiring layer connected to a pixel circuit, and a second substrate on which a counter electrode is formed, and said first and second substrates being connected to each other via a sealing member, said method for manufacturing a liquid crystal display device comprising:

forming an alignment film on the upper end part of said first substrate using an alignment plate in which a cut-out part is formed so that at least a portion of the covering cut-out part is positioned on said conducting electrode;

performing a rubbing treatment on said alignment film;

forming a sealing member so that this sealing member covers the conducting electrode; and pasting said first substrate and second substrate together, with said sealing member interposed therebetween.

29. A method for manufacturing a liquid crystal display device, said method comprising:

forming pixel circuits and a wiring layer connected to these pixel circuits on an insulating substrate, then forming an insulating layer so that this insulating layer covers said pixel circuits and wiring layer, and forming a conducting electrode which is connected to said wiring layer on a portion of said insulating layer that is located further to the outside than the region directly above said pixel circuits, so that a first substrate is obtained;

printing an alignment film on said insulating layer using an alignment plate in which a cut-out part is formed in the end part, so that the region directly above said pixel circuits is covered, and at least a portion of the cut-out part is positioned on said conducting electrode performing a rubbing treatment on said alignment film;

coating said conducting electrode with a resin that includes conductive particles so that a sealing member is formed;

pasting the first substrate on which this sealing member is formed and a second substrate on which a counter electrode is formed together via said sealing member; and sealing a liquid crystal layer between said first substrate and second substrate.

30. The liquid crystal display device according to claim 4, wherein said cut-out part has a triangular shape.

* * * * *